(12) United States Patent
Ono

(10) Patent No.: US 8,625,133 B2
(45) Date of Patent: Jan. 7, 2014

(54) PRINT DATA PROCESSING APPARATUS, PRINT DATA PROCESSING METHOD, AND STORAGE MEDIUM

(75) Inventor: Takashi Ono, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 12/855,537

(22) Filed: Aug. 12, 2010

(65) Prior Publication Data

US 2011/0043855 A1 Feb. 24, 2011

(30) Foreign Application Priority Data

Aug. 21, 2009 (JP) .................................. 2009-192236

(51) Int. Cl.
*G06F 3/12* (2006.01)
*G06K 15/00* (2006.01)

(52) U.S. Cl.
USPC ......... 358/1.15; 358/1.13; 358/1.18; 358/1.9; 358/1.1

(58) Field of Classification Search
None
See application file for complete search history.

(56) References Cited

U.S. PATENT DOCUMENTS

| 5,652,711 | A * | 7/1997 | Vennekens | 358/1.17 |
| 6,662,270 | B1 * | 12/2003 | Sans et al. | 711/118 |
| 8,054,474 | B2 * | 11/2011 | Torii | 358/1.11 |
| 2002/0163664 | A1 * | 11/2002 | Sugano | 358/1.15 |
| 2004/0095596 | A1 * | 5/2004 | Rijavec | 358/1.15 |
| 2004/0197124 | A1 * | 10/2004 | Klassen | 400/70 |
| 2008/0007754 | A1 * | 1/2008 | Torii | 358/1.12 |
| 2009/0067004 | A1 * | 3/2009 | Mazur | 358/1.17 |
| 2010/0277757 | A1 * | 11/2010 | Smith | 358/1.15 |

FOREIGN PATENT DOCUMENTS

| JP | H05-201077 A | 8/1993 |
| JP | 2002248829 A | 9/2002 |
| JP | 2008015605 A | 1/2008 |
| WO | 2009038670 A1 | 3/2009 |

* cited by examiner

*Primary Examiner* — King Poon
*Assistant Examiner* — Vincent Peren
(74) *Attorney, Agent, or Firm* — Canon U.S.A., Inc. IP Division

(57) ABSTRACT

A print data processing apparatus includes a first processor and a second processor. The first processor rasterizes a resource of print data corresponding to pages that precede an m-th page, in a case where a plurality of pages of print data share the resource, and generates intermediate data of the m-th page using the rasterized resource without generating any intermediate data of the pages that precede the m-th page. The second processor rasterizes a resource of print data corresponding to pages that precede an n-th page without using a resource rasterized by the first processor corresponding to pages that precede an m-th page and generates intermediate data of the n-th page using the rasterized resource without generating any intermediate data of the pages that precede the n-th page, wherein the n-th page is one of pages that follow the m-th page.

3 Claims, 17 Drawing Sheets

INITIALIZATION STATE

PROCESSING STATE

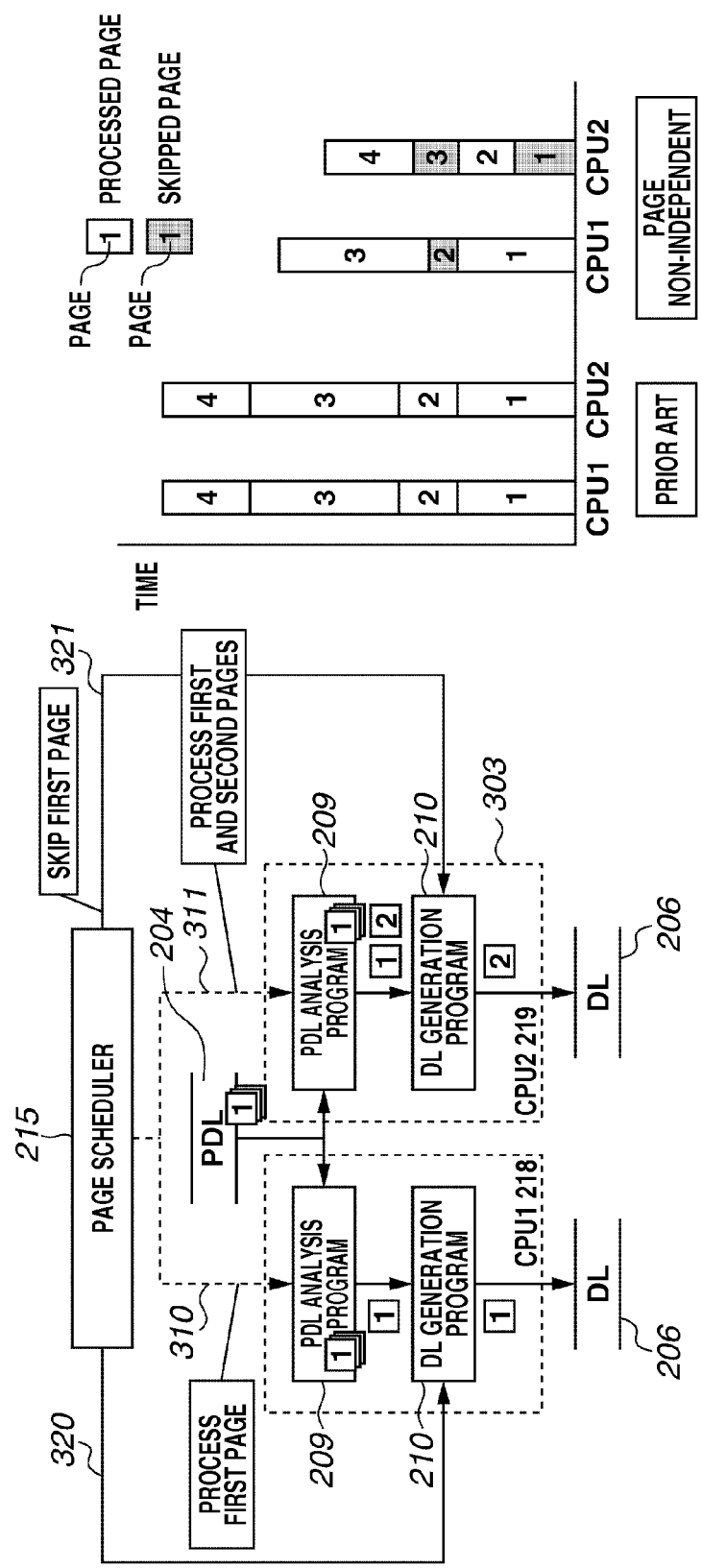

PRINT DATA PROCESSING APPARATUS, PRINT DATA PROCESSING METHOD, AND STORAGE MEDIUM

BACKGROUND OF THE INVENTION

1. Field of the Invention

The present invention relates to a print data processing apparatus, a print data processing method, and a storage medium.

2. Description of the Related Art

When an image forming apparatus (e.g., a copying machine) performs an image output operation, the image forming apparatus generates intermediate data based on an analysis on a Page Description Language (PDL) serving as print data and rasterizes the intermediate data into raster data. The PDL can define rendering commands for respective data, such as characters and graphics data.

The PDLs can be classified into various types. For example, if a PDL includes characters and graphics data that are independent in each page and there is no dependency between characters and graphics data of different pages, the PDL is referred to as an "independent PDL."

Further, if the above-described data can be shared among a plurality of pages included in the PDL, the PDL is referred to as a "non-independent PDL." The above-described data is generally referred to as a "resource." Further, if the independent PDL includes directly accessible head data of a page, the PDL is referred to as a "directly accessible PDL."

The recent progress in hardware technologies has introduced multicore processors, which are installable in a Multi Function Peripheral (MFP). The multicore processors enable the MFP to realize parallel operations of a plurality of functions (e.g., copy and print) that can be smoothly performed.

A printing control technique discussed in Japanese Patent Application Laid-Open No. 05-201077 uses multicore processors to speedily perform drawing processing based on a PDL.

The above-described printing control technique discussed in Japanese Patent Application Laid-Open No. 05-201077 includes reading a row of print commands (PDL) that extends on a plurality of pages when a PDL is allocated to different processors on a page-by-page basis, and executing empty drawing for setting drawing attribute parameters of each page without performing actual drawing (real drawing). The above-described conventional printing control technique further includes causing each processor to execute real drawing processing according to the row of print commands when the empty drawing of a page has been completed.

SUMMARY OF THE INVENTION

A print data processing apparatus includes a first processor configured to rasterize a resource of print data corresponding to pages that precede an m-th page, in a case where a plurality of pages of print data share the resource, and configured to generate intermediate data of the m-th page using the rasterized resource without generating any intermediate data of the pages that precede the m-th page, and a second processor configured to rasterize a resource of print data corresponding to pages that precede an n-th page and configured to generate intermediate data of the n-th page using the rasterized resource without generating any intermediate data of the pages that precede the n-th page, wherein the n-th page is one of pages that follow the m-th page.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 15A, 15B, and 15C illustrate examples of a relationship between an example module control and required processing time in scheduling processing according to the first exemplary embodiment of the present invention.

DESCRIPTION OF THE EMBODIMENTS

Various exemplary embodiments, features, and aspects of the invention will be described in detail below with reference to the drawings. In the context of each exemplary embodiment of the present invention, the term "PDL" is referred to as print data usable in a document printing operation, in which positional information and format information of characters and graphics are defined beforehand. The term "resource" is referred to as data repetitively used when a PDL including a plurality of pages is converted into intermediate data.

Rasterization of the resource includes, for example, conversion of compressed image data into a bitmap image or conversion of a character code into a character pattern (i.e., a character image). The term "non-independent PDL" represents a PDL including a plurality of pages that share a resource. The term "independent PDL" represents a PDL including characters and graphics data defined for each page and includes a plurality of pages that do not need to share a resource.

The term "directly accessible PDL" represents a PDL that includes a leading analysis command of each page that is directly accessible and includes a plurality of pages that do not need to share a resource. The term "independent PDL" represents a PDL that does not enable to directly access a leading analysis command of each page. The term "analysis" is referred to as performing processing for reading a print command of a PDL and identifying the type of the read print command.

A configuration of an image forming apparatus according to a first exemplary embodiment is described below in detail with reference to FIG. 1.

Figure 1:
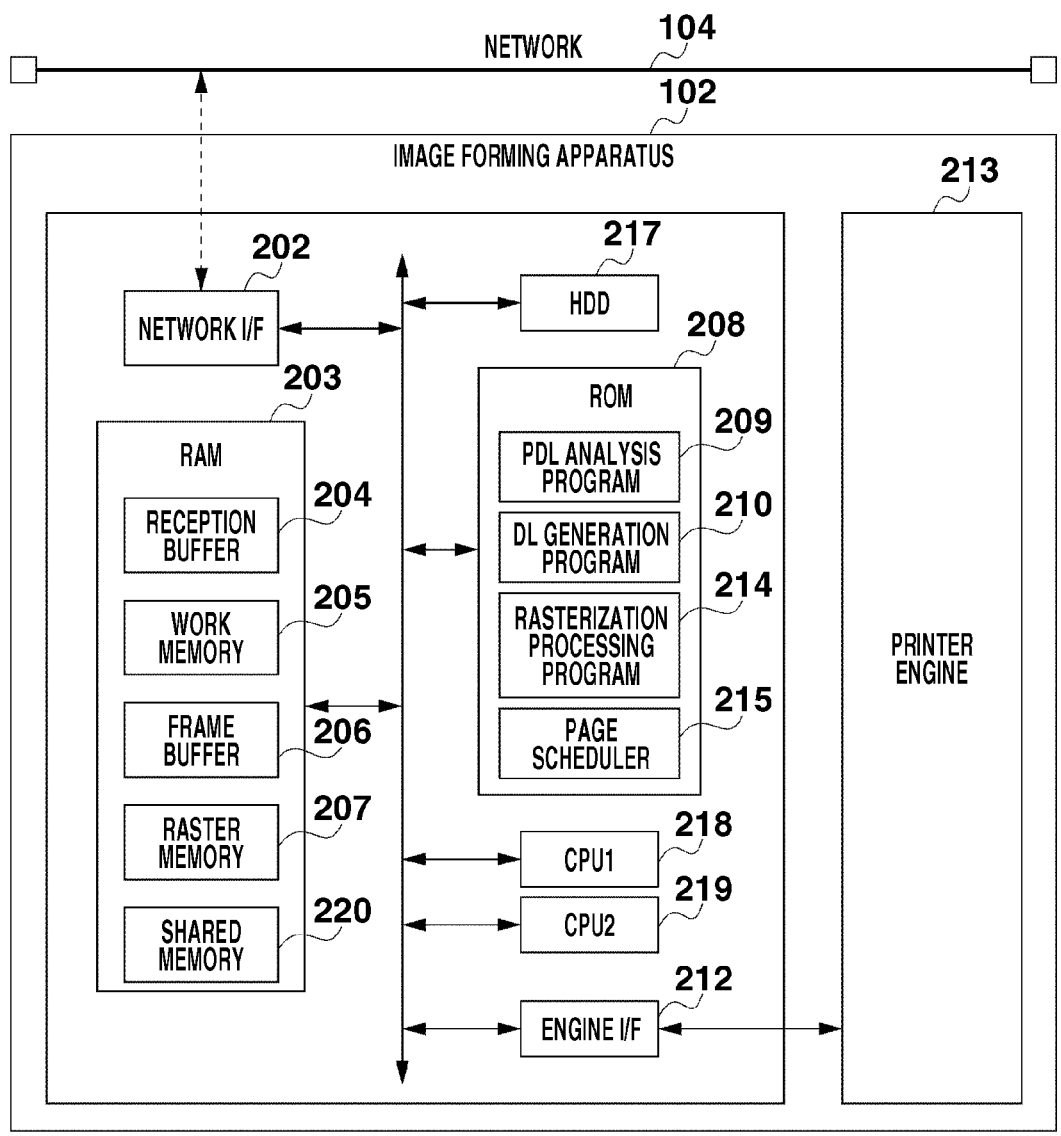
FIG. 1 is a block diagram illustrating an example of a system configuration of an image forming apparatus according to a first exemplary embodiment of the present invention.

FIG. 1 is a block diagram illustrating an example of a system configuration of an image forming apparatus 102 that performs print data processing according to the first exemplary embodiment of the present invention. The image forming apparatus 102 illustrated in FIG. 1 includes a network interface (I/F) 202, a random access memory (RAM) 203, a read only memory (ROM) 208, and a hard disc drive (HDD) 217. Further, the image forming apparatus 102 includes a central processing unit 1 (CPU1) 218, a CPU2 219, an engine I/F 212, and a printer engine 213.

The network I/F 202 is a functional unit configured to input and output information from and to an external device. For example, the network I/F 202 can receive a PDL transmitted from an external device via a network 104.

The RAM 203 is a functional unit configured to temporarily store various kinds of information. More specifically, the RAM 203 includes a reception buffer 204, a work memory 205, a frame buffer 206, a raster memory 207, and a shared memory 220.

The reception buffer 204 serves as a storage area capable of storing each PDL received from an external device via the network I/F 202. The work memory 205 serves as a work storage area that is temporarily usable when the received PDL is converted into an intermediate code. The frame buffer 206 serves as a storage area capable of storing the intermediate code converted in the image forming apparatus 102. The raster memory 207 serves as a storage area capable of storing the data having been subjected to rendering processing after being rasterized from the intermediate code.

The shared memory 220 serves as a storage area capable of storing data generated through processing performed by the CPU1 218 or the CPU2 219 or both units according to programs stored in the ROM 208. Further, when both units are accessible to the shared memory 220, respective units can share the data stored in the shared memory 220. For example, in a case where a resource is stored in the shared memory 220, both units (CPU1 218 and CPU2 219) can share the resource stored in the shared memory 220.

The ROM 208 is a functional unit configured to store control programs that can be executed by the CPU1 218 or the CPU2 219, or both units, of the image forming apparatus 102 to perform processing. The ROM 208 includes a PDL analysis program 209, a display list (DL) generation program 210 that generates intermediate data (i.e., a DL), a rasterization processing program 214, and a page scheduler 215.

The PDL analysis program 209 is a program that can identify the type of each PDL that is read from the reception buffer 204. The type of each PDL is discriminable as one of a plurality of predetermined types. Further, the PDL analysis program 209 can cause the CPU to execute PDL analysis processing according to the identified type of the PDL.

The DL generation program 210 is a program that can generate intermediate data from the data analyzed by the PDL analysis program 209 and cause the CPU to execute processing for storing intermediate data into the frame buffer 206.

The rasterization processing program 214 is a program that can rasterize the intermediate data stored in the frame buffer 206 by rendering the same into bitmap data and cause the CPU to execute processing for storing the rasterized bitmap data into the raster memory 207.

The page scheduler 215 is a program that can request the CPU to execute page analysis processing and DL generation processing. More specifically, the page scheduler 215 requests the CPU1 218 and the CPU2 219 to execute the PDL analysis program 209 to analyze each page of a PDL and further execute the DL generation program 210 to generate a DL. The PDL analysis program 209 and the DL generation program 210 (i.e., the programs to be used to generate intermediate data based on print data) are hereinafter referred to as "print data processing program."

Further, the page scheduler 215 performs processing for identifying the type of a PDL received from an external device and allocating predetermined pages included in the PDL to two CPUs installed on the image forming apparatus 102 according to the identified type of the PDL. A detailed configuration of the page scheduler 215 is described below. Further, a third processor (not illustrated in the present exemplary embodiment), if provided as an additional CPU other than the CPU1 218 or the CPU2 219, can execute the above-described programs stored in the ROM 208.

The CPU1 218 is operable as a first processor according to the present exemplary embodiment. The CPU2 219 is operable as a second processor according to the present exemplary embodiment. Each of the CPU1 218 and the CPU2 219 is a central processing unit (CPU) that can perform arithmetic processing and various controls to be performed by the image forming apparatus 102. Respective units can execute a program loaded into the RAM 203 from the ROM 208 to perform predetermined data processing. Each CPU includes a "core processor", i.e., an assembly including a command generator and a calculator that are integrally operable.

The engine I/F 212 can input and output signals to and from the printer engine 213. The printer engine 213 can perform print processing, which includes electro-photographically forming a latent image on a photosensitive drum based on image data, transferring a toner image onto a recording paper, and fixing the transferred toner image.

Figure 2:
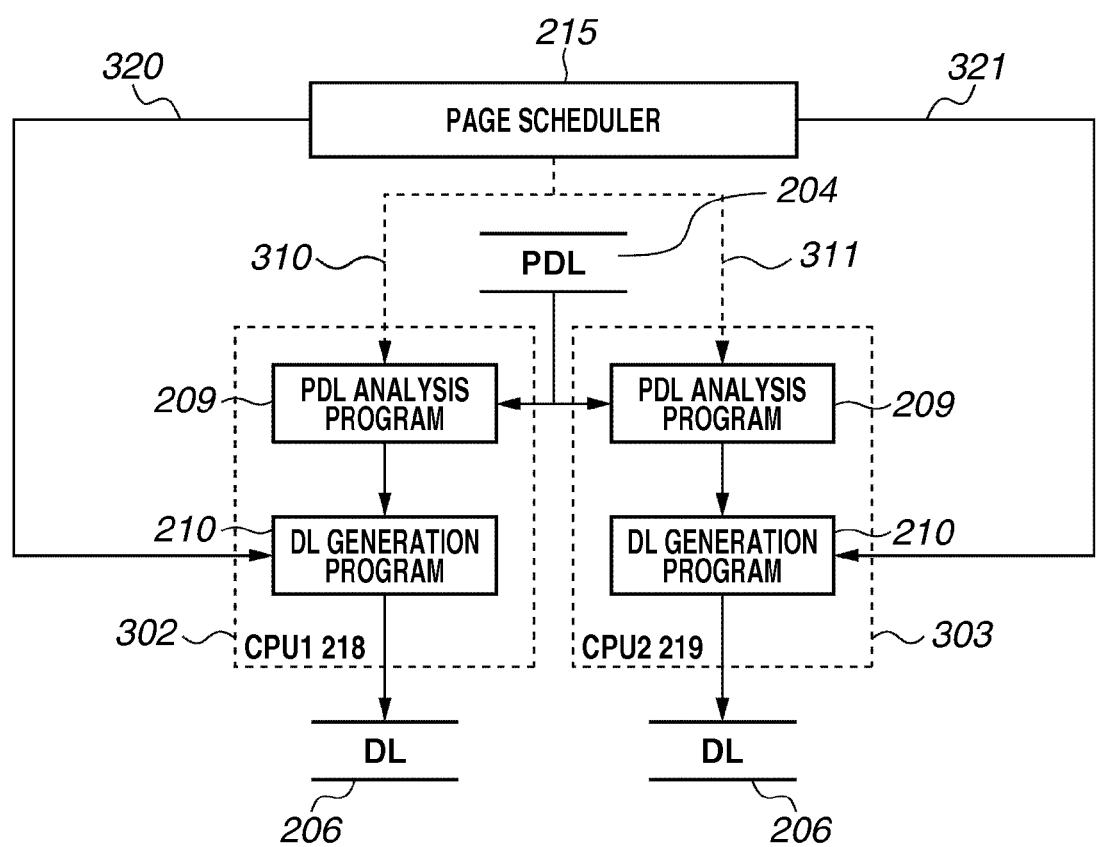
FIG. 2 is a block diagram illustrating an example of a module configuration of the image forming apparatus according to the first exemplary embodiment of the present invention.

Next, an example of processing to be performed by the page scheduler 215 according to the first exemplary embodiment of the present invention is described below. FIG. 2 illustrates an example of a module configuration of the page scheduler 215.

In FIG. 2, an area encircled by a dotted line 302 includes the PDL analysis program 209 and the DL generation program 210, which are executed by the CPU1 218 to perform PDL processing on a page-by-page basis. An area encircled by a dotted line 303 includes the PDL analysis program 209 and the DL generation program 210, which are executed by the CPU2 219 to perform PDL processing on a page-by-page basis.

The page scheduler 215 sends a control command 310 to the CPU1 218 to activate the PDL analysis program 209. Similarly, the page scheduler 215 sends a control command 311 to the CPU2 219 to activate the PDL analysis program 209. Further, the page scheduler 215 sends a control command 320 to the CPU1 218 to activate the DL generation program 210. Similarly, the page scheduler 215 sends a control command 321 to the CPU2 219 to activate the DL generation program 210.

The page scheduler 215 can use mathematical function call and inter-process communication to perform the above-described controls. The PDL analysis program 209 that can be executed by the CPU1 218 reads a PDL stored in the reception buffer 204 according to the control command 310 received from the page scheduler 215 and executes the PDL analysis processing.

The DL generation program 210 that can be executed by the CPU1 218 performs DL generation processing based on the control command 320 received from the page scheduler 215 and an analysis result sent from the PDL analysis program 209 and performs processing for storing a generated DL in the frame buffer 206.

The PDL analysis program 209 and the DL generation program 210 that can be executed by the CPU2 219 perform processing similar to those of the CPU1 218. The above-described module configuration can realize PDL page parallel processing.

Figure 3:
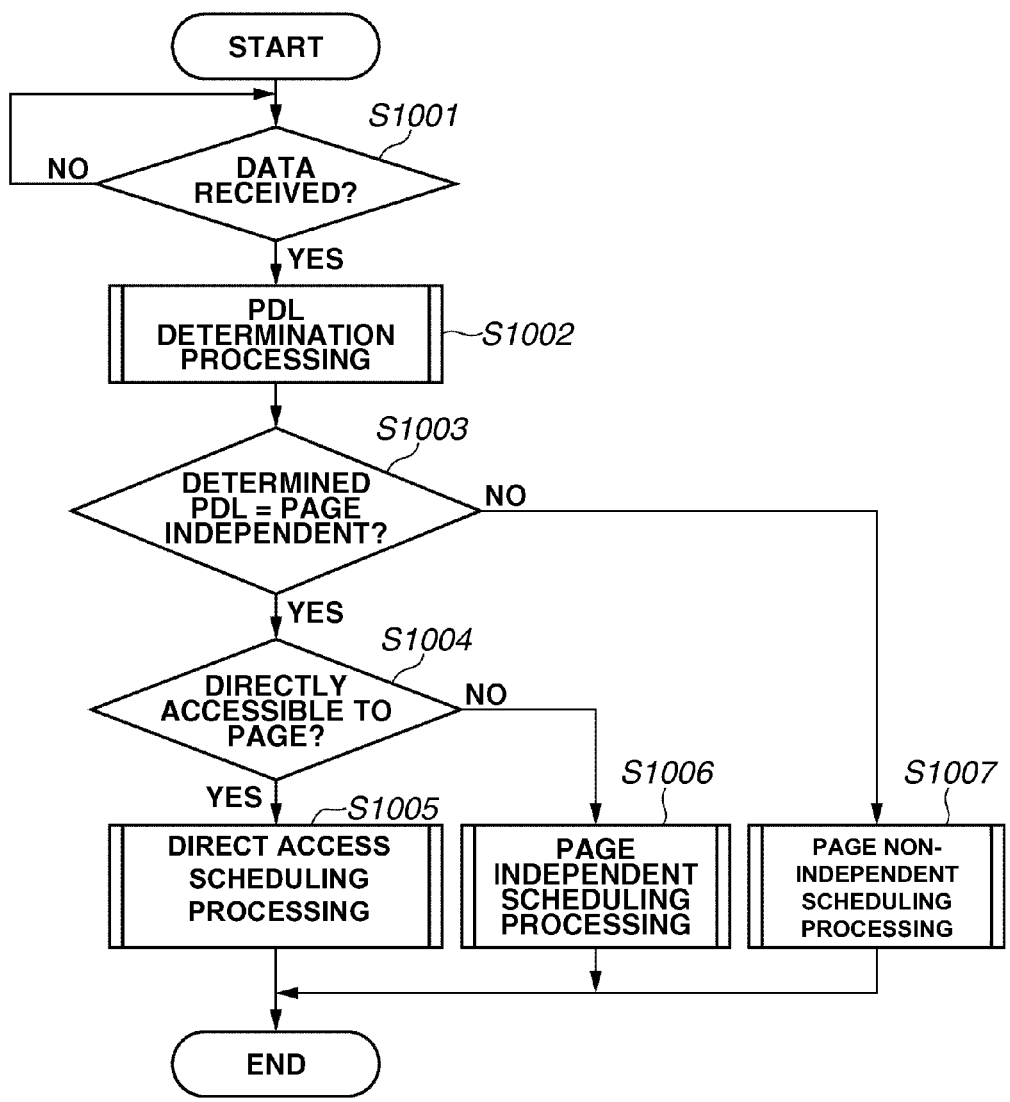
FIG. 3 is a flowchart illustrating an example of print processing that can be performed by the image forming apparatus according to the first exemplary embodiment.

FIG. 3 is a flowchart illustrating an example of print processing that can be performed by the image forming apparatus 102 according to the first exemplary embodiment.

In step S1001, the network I/F 202 receives a PDL transmitted via the network 104 from a PC connected to the network 104. The received PDL is stored in the reception buffer 204. In step S1002, the page scheduler 215 requests the PDL analysis program 209 to perform PDL determination processing to identify the type of the received PDL.

In step S1003, the page scheduler 215 determines whether the PDL identified by the PDL analysis program 209 is a non-independent PDL. If it is determined that the identified PDL is a non-independent PDL (NO in step S1003), then in step S1007, the page scheduler 215 executes page scheduling processing for the non-independent PDL. If it is determined that the PDL identified by the PDL analysis program 209 is a page independent PDL (YES in step S1003), then in step S1004, the page scheduler 215 further determines whether the identified PDL is a PDL directly accessible to page head data.

If it is determined that the determined PDL is not a directly accessible PDL (NO in step S1004), then in step S1006, the page scheduler 215 executes page scheduling processing for the page independent PDL. If it is determined that the determined PDL is a directly accessible PDL (YES in step S1004), then in step S1005, the page scheduler 215 executes page scheduling processing for the directly accessible PDL. As described above, appropriately executing the PDL analysis processing and the DL generation processing according to the type of each PDL is useful to enable a plurality of processors to appropriately perform drawing processing.

For example, in a case where the PDL to be processed is an independent PDL or a directly accessible PDL, a plurality of pages included in the PDL do not share a resource. Therefore, it is unnecessary to perform processing in which a resource is shared by a plurality of PDL analysis processing. Hence, the CPU does not execute the processing in which a resource is shared by a plurality of PDL analysis processing.

On the other hand, in a case where the PDL to be processed is a non-independent PDL, a plurality of pages included in the PDL share a resource. Therefore, it is necessary to perform processing in which a resource is shared by a plurality of PDL analysis processing. Therefore, in this case, the CPU executes the processing in which a resource is shared by a plurality of PDL analysis processing.

Further, in a case where the PDL to be processed is a directly accessible PDL, it is unnecessary to perform PDL analysis processing for pages that precedes a target page. Therefore, a PDL analysis processing program does not perform PDL analysis processing for the pages that precedes the target page.

Figure 4:
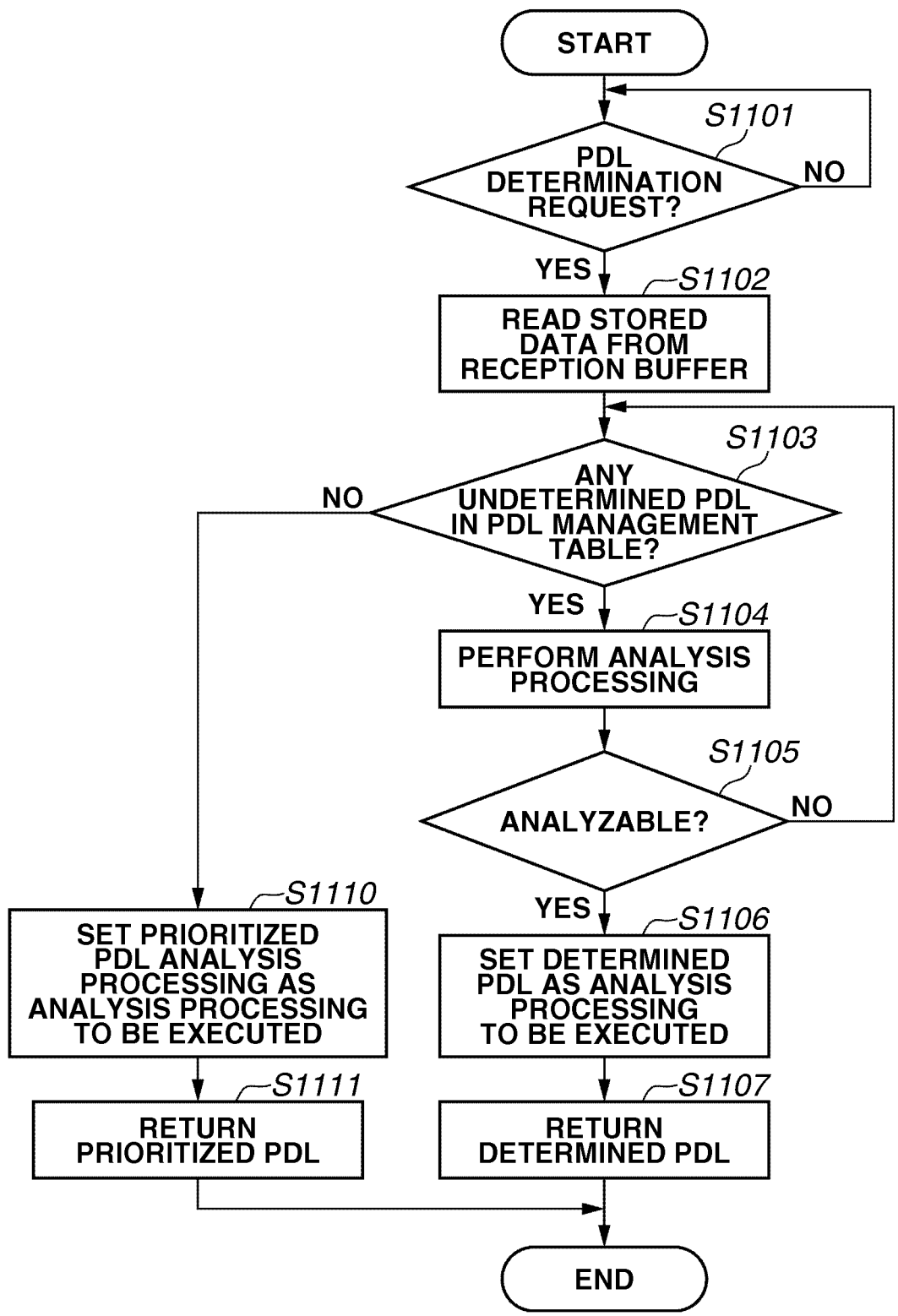
FIG. 4 is a flowchart illustrating an example of PDL determination processing that can be performed by a PDL analysis program according to the first exemplary embodiment of the present invention.

FIG. 4 is a flowchart illustrating an example of the PDL determination processing to be performed by the PDL analysis program 209 according to the first exemplary embodiment. The PDL analysis program 209 executes the following processing.

In step S1101, the PDL analysis program 209 determines whether a PDL determination request is received from the page scheduler 215. If it is determined that PDL determination request is received (YES in step S1101), then in step S1102, the PDL analysis program 209 reads stored data from the reception buffer 204.

In step S1103, the PDL analysis program 209 determines whether there is any undetermined PDL analysis processing in a PDL management table that is described below. If it is determined that the undetermined PDL analysis processing is present (YES in step S1103), then in step S1104, the PDL analysis program 209 analyzes a part of a print command of the target PDL. In step S1105, the PDL analysis program 209 determines whether the target PDL is analyzable data.

If it is determined that the target PDL is analyzable data (YES in step S1105), then in step S1106, the PDL analysis program 209 sets the determined PDL analysis processing as PDL analysis processing to be executed. Then in step S1107, the PDL analysis program 209 returns the determined PDL to the page scheduler 215. If it is determined that there in not any undetermined PDL analysis processing (NO in step S1103), then in step S1110, the PDL analysis program 209 sets prioritized PDL analysis processing, which is set beforehand, as analysis processing to be executed. Then, in step S1111, the PDL analysis program 209 returns the prioritized PDL to the page scheduler 215.

Figure 13:
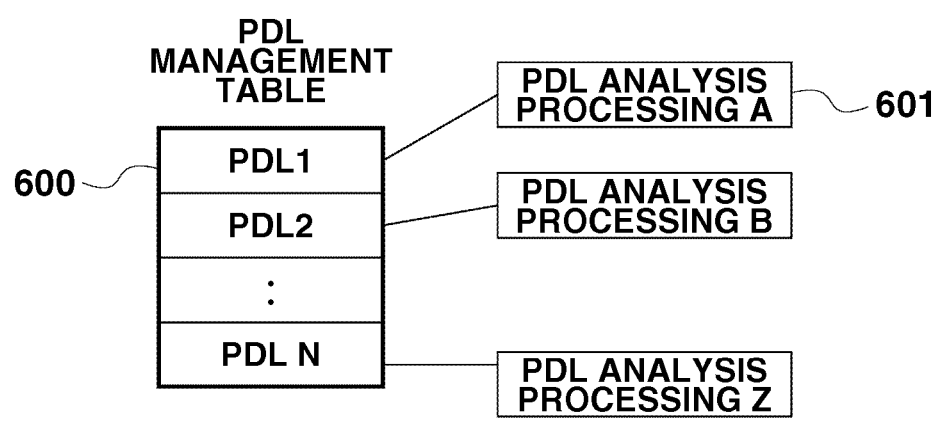
FIG. 13 illustrates an example of a PDL management table according to the first exemplary embodiment of the present invention.

FIG. 13 illustrates an example of the PDL management table that can be used for the PDL determination processing according to the present exemplary embodiment.

A PDL management table 600 is a table that stores type information of each PDL and a pointer of PDL analysis processing 601. The PDL analysis processing 601 includes a mathematical function that performs data analysis processing for each PDL. In the PDL determination processing, the PDL analysis program 209 executes analysis processing in order of PDL 1, PDL 2 and PDL N and determines the PDL that can be analyzed.

Figure 14A:
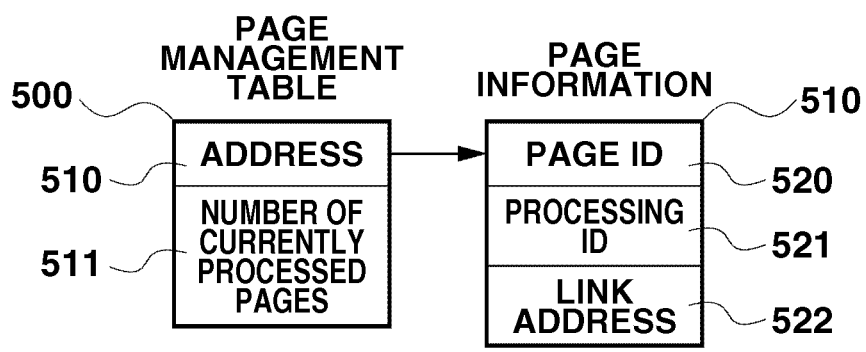
FIGS. 14A, 14B, and 14C illustrate examples of a page management table according to the first exemplary embodiment of the present invention.

FIG. 14A illustrates an example of a page management table that can be used by the page scheduler 215 to perform page management according to the first exemplary embodiment.

A page management table 500 is a page management table that is usable to manage a currently processed page. The page management table 500 includes an address 510 of page information 501 and the number of currently processed pages 511. The page information 501 stores information of the currently processed page. The page information 501 includes a page ID 520 that identifies the currently processed page, a processing ID 521 that identifies processing currently applied to the page, and a link address 522 that is linked to the next page management list.

Figure 14B:
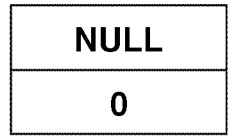
Figure 14C:
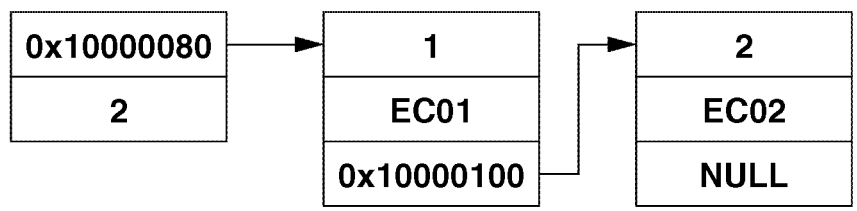

FIG. 14B illustrates the page management table in an initialization state, according to which the address 510 of the page information is NULL and the number of currently processed pages 511 is equal to 0. FIG. 14C illustrates the page management table in a processing state, according to which the number of currently processed pages 511 is equal to 2 (namely, there are two pieces of page information) and the link address 522 of the final page information is NULL.

Figure 5:
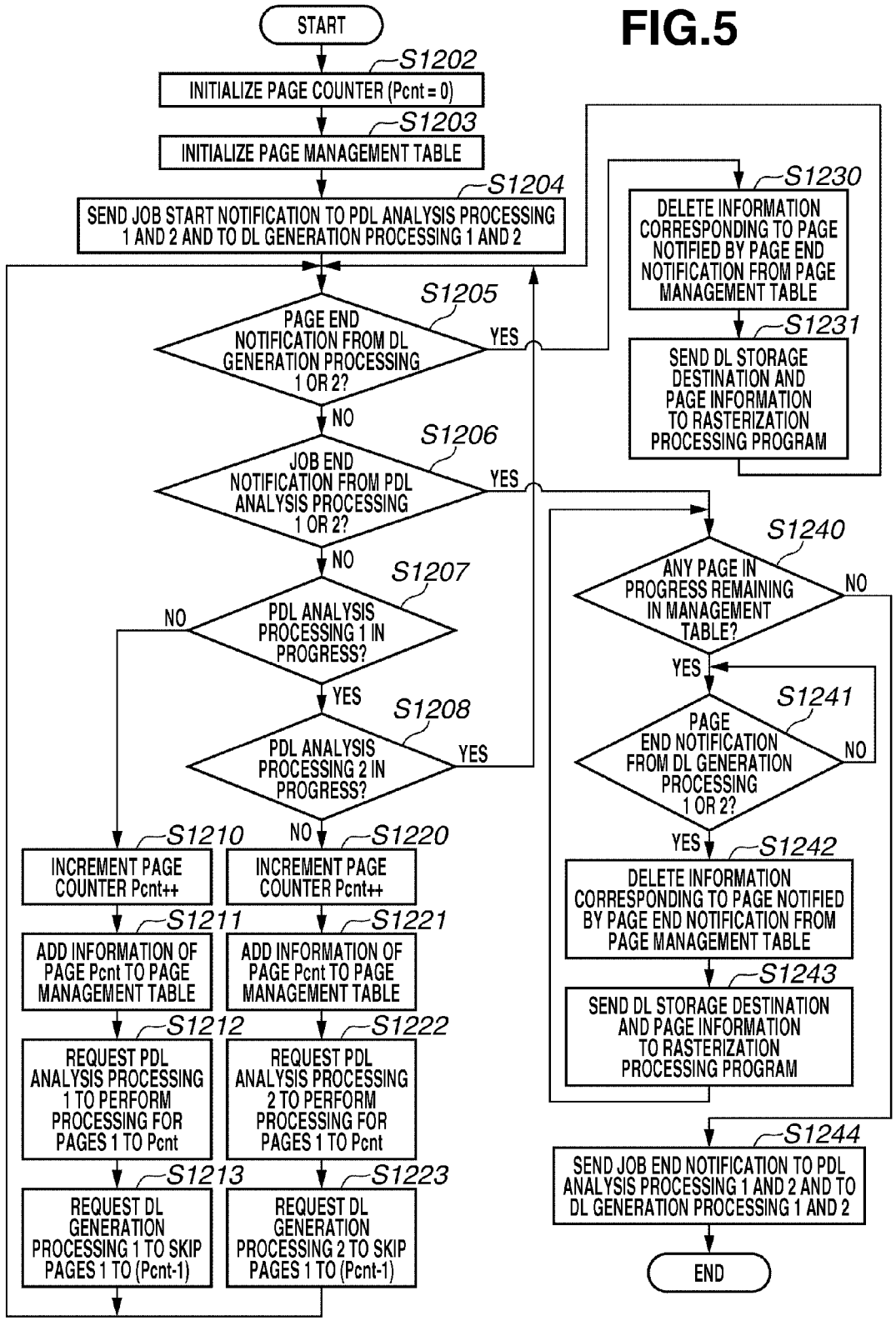
FIG. 5 is a flowchart illustrating an example scheduling for a page non-independent PDL according to the first exemplary embodiment of the present invention.

FIG. 5 is a flowchart illustrating an example page scheduling for a page non-independent PDL that can be performed by the page scheduler 215 according to the first exemplary embodiment. The PDL analysis program 209 executes the following processing.

Further, it is assumed that an n-th page represents a page to be processed by the CPU1 218 and an m-th page represents a page to be processed by the CPU2 219. Further, an x-th page is the next page of a page whose intermediate data is already generated by the CPU1 218 before the n-th page is processed. Further, a y-th page is the next page of a page whose intermediate data is already generated by the CPU2 219 before the m-th page is processed.

In step S1202, the page scheduler 215 initializes a page counter Pcnt (i.e., Pcnt=0). Then, in step S1203, the page scheduler 215 initializes the page management table stored in the work memory 205. In step S1204, the page scheduler 215 sends a job start notification to PDL analysis processing 1 and 2 of the PDL analysis program 209 and to DL generation processing 1 and 2 of the DL generation program 210. In step S1205, the page scheduler 215 determines whether a page end notification is received from the DL generation processing 1 or the DL generation processing 2 of the DL generation program 210.

If it is determined that the page end notification is not received from the DL generation processing 1 or the DL generation processing 2 (NO instep S1205), then in step S1206, the page scheduler 215 determines whether a job end notification is received from the PDL analysis processing 1 or the PDL analysis processing 2 of the PDL analysis program 209. If it is determined that the job end notification is not received from the PDL analysis processing 1 or the PDL analysis processing 2 (NO in step S1206), then in step S1207, the page scheduler 215 searches through the page management table stored in the work memory 205 and determines whether the PDL analysis processing 1 of the PDL analysis program 209 is in progress.

If it is determined that the PDL analysis processing 1 of the PDL analysis program 209 is not in progress (NO in step S1207), then in step S1210, the page scheduler 215 increments the page counter Pcnt. In step S1211, the page scheduler 215 adds information of the page Pcnt to the page management table stored in the work memory 205. For example, if the added page is the third page, m is set to 3.

In step S1212, the page scheduler 215 requests the PDL analysis processing 1 of the PDL analysis program 209 to perform processing for the pages 1 to Pcnt. According to the above-described example, the PDL analysis processing is performed for the first to m-th pages. Further, in step S1213, the page scheduler 215 requests the DL generation processing 1 of the DL generation program 210 to skip the pages 1 to (Pcnt−1). More specifically, the DL generation processing 1 of the DL generation program 210 does not generate any intermediate data of the pages 1 to (Pcnt−1) (i.e., the first and second pages). Then, the DL generation processing 1 generates intermediate data based on the PDL of the page Pcnt (i.e., the m-th page).

If it is determined that the PDL analysis processing 1 of the PDL analysis program 209 is in progress (YES in step S1207), then in step S1208, the page scheduler 215 searches through the page management table stored in the work memory 205 and determines whether the PDL analysis processing 2 of the PDL analysis program 209 is in progress. According to the above-described example, the PDL analysis processing 1 is performing the processing for the m-th page. If it is determined that the PDL analysis processing 2 of the PDL analysis program 209 is not in progress (NO instep S1208), then in step S1220, the page scheduler 215 increments the page counter Pcnt. In this case, the page counter Pcnt becomes 4 and n is set to 4.

In step S1221, the page scheduler 215 adds information of the page Pcnt to the page management table stored in the work memory 205 (namely, the fourth page is added). In step S1222, the page scheduler 215 requests the PDL analysis processing 2 of the PDL analysis program 209 to perform processing for the pages 1 to Pcnt (i.e., the first to n-th pages). Further, in step S1223, the page scheduler 215 requests the DL generation processing 2 of the DL generation program 210 to skip the pages 1 to (Pcnt−1) (i.e., the first to third pages). More specifically, the DL generation processing 2 of the DL generation program 210 does not generate any intermediate data of the pages 1 to (Pcnt−1) (i.e., the first to third pages). Then, the DL generation processing 2 generates intermediate data based on the PDL of the page Pcnt (i.e., the n-th page).

If it is determined that the page end notification is received from the DL generation processing 1 or the DL generation processing 2 (YES in step S1205), then in step S1230, the page scheduler 215 deletes the page information corresponding to the page notified by the page end notification from the page management table stored in the work memory 205. In step S1231, the page scheduler 215 sends a DL storage destination related with the frame buffer 206 notified by the page end notification together with page information to the rasterization processing program 214 and requests the rasterization processing program 214 to perform the processing.

If it is determined that the job end notification is received from the PDL analysis processing 1 or the PDL analysis processing 2 (YES in step S1206), then in step S1240, the page scheduler 215 determines whether any page being currently processed remains in the page management table of the work memory 205. If it is determined that the page being currently processed is present (YES in step S1240), then in step S1241, the page scheduler 215 waits for a page end notification sent from the DL generation processing 1 or the DL generation processing 2 of the DL generation program 210.

If it is determined that the page end notification is received (YES in step S1241), then in step S1242, the page scheduler 215 deletes the page information corresponding to the page notified by the page end notification from the page management table stored in the work memory 205. In step S1243, the page scheduler 215 sends a DL storage destination related with the frame buffer 206 notified by the page end notification together with page information to the rasterization processing program 214 and requests the rasterization processing program 214 to perform the processing.

If it is determined that there is not any page remaining in the page management table (NO instep S1240), then in step S1244, the page scheduler 215 sends a job end notification to the PDL analysis processing 1 and 2 of the PDL analysis program 209 and to the DL generation processing 1 and 2 of the DL generation program 210.

Figure 6:
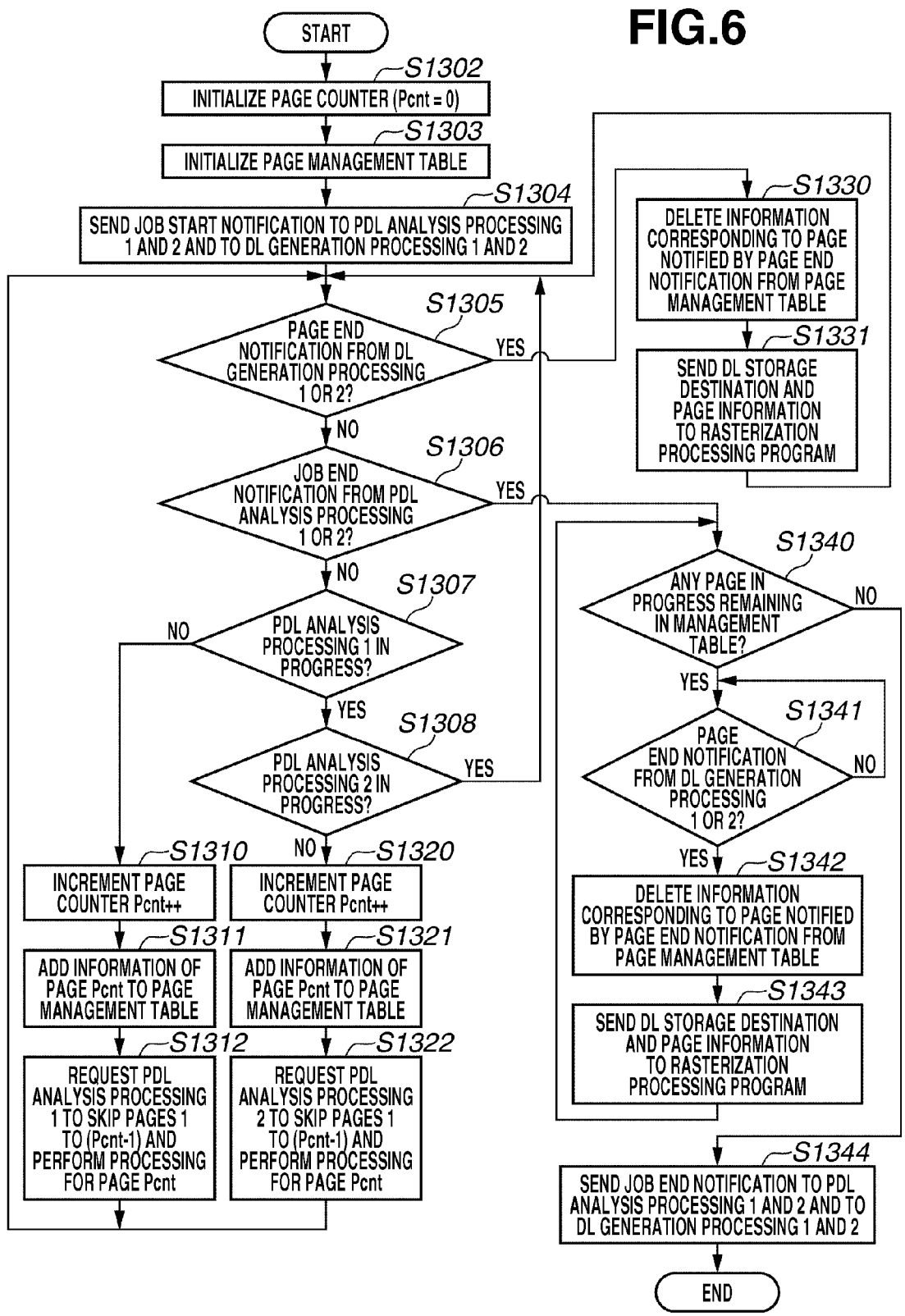
FIG. 6 is a flowchart illustrating an example scheduling for a page independent PDL according to the first exemplary embodiment of the present invention.

FIG. 6 is a flowchart illustrating an example page scheduling for a page independent PDL that can be performed by the page scheduler 215 according to the first exemplary embodiment. The page scheduler 215 executes the following processing.

In step S1302, the page scheduler 215 initializes the page counter Pcnt (i.e., Pcnt=0). Then, in step S1303, the page scheduler 215 initializes the page management table stored in the work memory 205. In step S1304, the page scheduler 215 sends a job start notification to the PDL analysis processing 1 and 2 of the PDL analysis program 209 and to the DL generation processing 1 and 2 of the DL generation program 210. In step S1305, the page scheduler 215 determines whether a page end notification is received from the DL generation processing 1 or the DL generation processing 2 of the DL generation program 210.

If it is determined that the page end notification is not received from the DL generation processing 1 or the DL generation processing 2 (NO instep S1305), then in step S1306, the page scheduler 215 determines whether a job end notification is received from the PDL analysis processing 1 or the PDL analysis processing 2 of the PDL analysis program 209. If it is determined that the job end notification is not received from the PDL analysis processing 1 or the PDL analysis processing 2 (NO in step S1306), then in step S1307, the page scheduler 215 searches through the page management table stored in the work memory 205 and determines whether the PDL analysis processing 1 of the PDL analysis program 209 is in progress.

If it is determined that the PDL analysis processing 1 of the PDL analysis program 209 is not in progress (NO in step S1307), then in step S1310, the page scheduler 215 increments the page counter Pcnt. In step S1311, the page scheduler 215 adds information of the page Pcnt to the page management table stored in the work memory 205. In step S1312, the page scheduler 215 requests the PDL analysis processing 1 of the PDL analysis program 209 to skip the pages 1 to (Pcnt−1) and perform processing for the page Pcnt. Further, the page scheduler 215 requests the DL generation processing 1 to perform the page Pcnt processing.

If it is determined that the PDL analysis processing 1 of the PDL analysis program 209 is in progress (YES in step 1307), then in step S1308, the page scheduler 215 searches through the page management table stored in the work memory 205 and determines whether the PDL analysis processing 2 of the PDL analysis program 209 is in progress. If it is determined that the PDL analysis processing 2 of the PDL analysis program 209 is not in progress (NO in step S1308), then in step S1320, the page scheduler 215 increments the page counter Pcnt.

In step S1321, the page scheduler 215 adds information of the page Pcnt to the page management table stored in the work memory 205. In step S1322, the page scheduler 215 requests the PDL analysis processing 2 of the PDL analysis program 209 to skip the pages 1 to (Pcnt−1) and perform processing for the page Pcnt. Further, the page scheduler 215 requests the DL generation processing 2 to perform the page Pcnt processing.

If it is determined that the page end notification is received from the DL generation processing 1 or the DL generation processing 2 (YES in step S1305), then in step S1330, the page scheduler 215 deletes the page information corresponding to the page notified by the page end notification from the page management table stored in the work memory 205. In step S1331, the page scheduler 215 sends a DL storage destination related with the frame buffer 206 notified by the page end notification together with page information to the rasterization processing program 214 and requests the rasterization processing program 214 to perform the processing.

If it is determined that the job end notification is received from the PDL analysis processing 1 or the PDL analysis processing 2 (YES in step S1306), then in step S1340, the page scheduler 215 determines whether any page being currently processed remains in the page management table of the work memory 205.

If it is determined that the page being currently processed is present (YES in step S1340), then in step S1341, the page scheduler 215 waits for a page end notification sent from the DL generation processing 1 or the DL generation processing 2 of the DL generation program 210. If it is determined that the page end notification is received (YES in step S1341), then in step S1342, the page scheduler 215 deletes the page information corresponding to the page notified by the page end notification from the page management table stored in the work memory 205.

In step S1343, the page scheduler 215 sends a DL storage destination related with the frame buffer 206 notified by the page end notification together with page information to the rasterization processing program 214 and requests the rasterization processing program 214 to perform the processing.

If it is determined that there is not any page remaining in the page management table (NO instep S1340), then in step S1344, the page scheduler 215 sends a job end notification to the PDL analysis processing 1 and 2 of the PDL analysis program 209 and to the DL generation processing 1 and 2 of the DL generation program 210.

Figure 7:
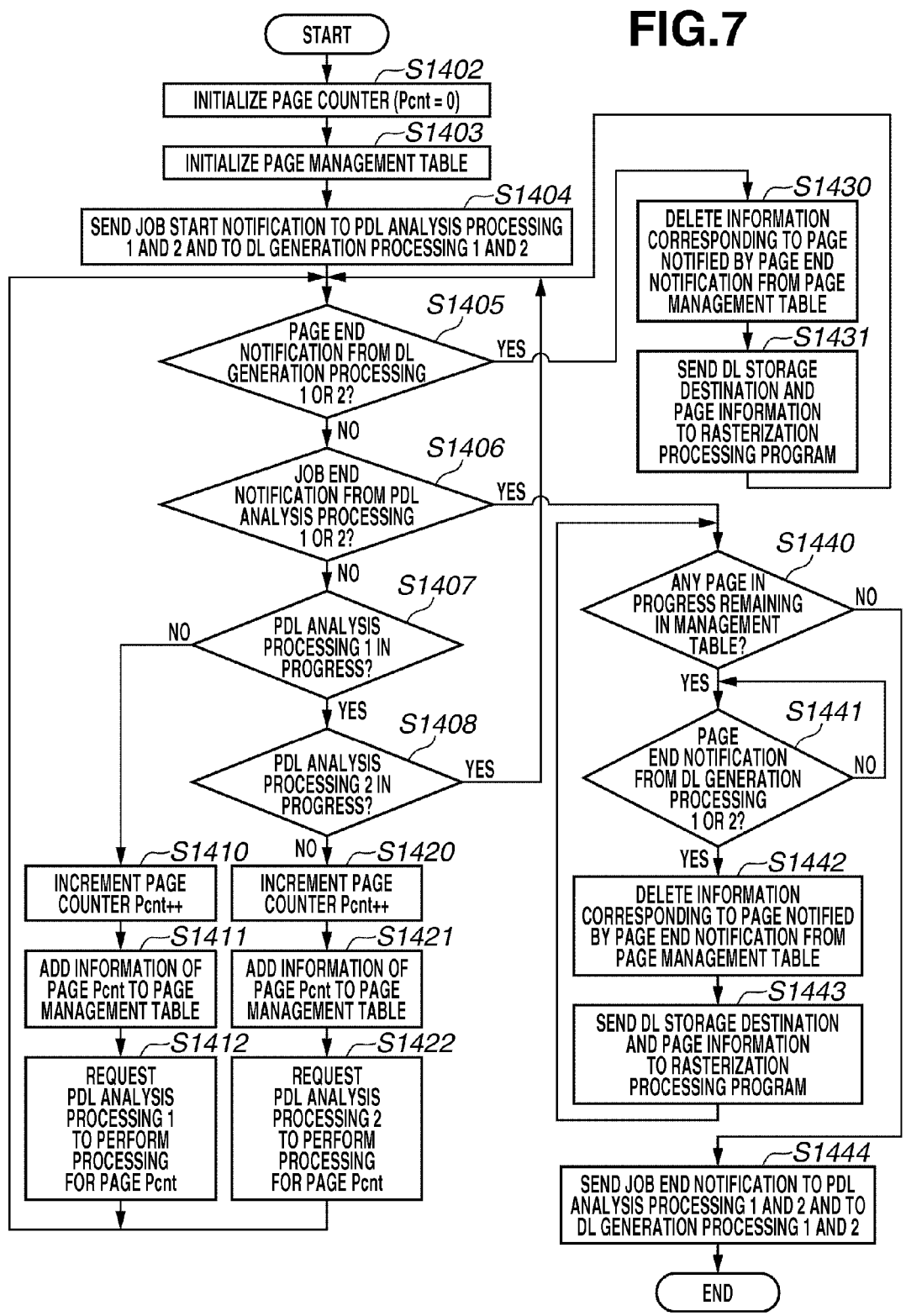
FIG. 7 is a flowchart illustrating an example scheduling for a page directly accessible PDL according to the first exemplary embodiment of the present invention.

FIG. 7 is a flowchart illustrating an example page scheduling for a directly accessible PDL that can be performed by the page scheduler 215 according to the first exemplary embodiment. The page scheduler 215 executes the following processing.

Instep S1402, the page scheduler 215 initializes the page counter Pcnt (i.e., Pcnt=0). Then, in step S1403, the page scheduler 215 initializes the page management table stored in the work memory 205. In step S1404, the page scheduler 215 sends a job start notification to the PDL analysis processing 1 and 2 of the PDL analysis program 209 and to the DL generation processing 1 and 2 of the DL generation program 210.

In step S1405, the page scheduler 215 determines whether a page end notification is received from the DL generation processing 1 or the DL generation processing 2 of the DL generation program 210. If it is determined that the page end notification is not received from the DL generation processing 1 or the DL generation processing 2 (NO in step S1405), then in step S1406, the page scheduler 215 determines whether a job end notification is received from the PDL analysis processing 1 or the PDL analysis processing 2 of the PDL analysis program 209.

If it is determined that the job end notification is not received from the PDL analysis processing 1 or the PDL analysis processing 2 (NO in step S1406), then in step S1407, the page scheduler 215 searches through the page management table stored in the work memory 205 and determines whether the PDL analysis processing 1 of the PDL analysis program 209 is in progress.

If it is determined that the PDL analysis processing 1 of the PDL analysis program 209 is not in progress (NO in step S1407), then in step S1410, the page scheduler 215 increments the page counter Pcnt. In step S1411, the page scheduler 215 adds information of the page Pcnt to the page management table stored in the work memory 205. In step S1412, the page scheduler 215 requests the PDL analysis processing 1 of the PDL analysis program 209 to perform processing for the page Pcnt.

If it is determined that the PDL analysis processing 1 of the PDL analysis program 209 is in progress (i.e., YES in step 1407), then in step S1408, the page scheduler 215 searches through the page management table stored in the work memory 205 and determines whether the PDL analysis processing 2 of the PDL analysis program 209 is in progress. If it is determined that the PDL analysis processing 2 of the PDL analysis program 209 is not in progress (NO in step S1408), then in step S1420, the page scheduler 215 increments the page counter Pcnt.

In step S1421, the page scheduler 215 adds information of the page Pcnt to the page management table stored in the work memory 205. Further, in step S1422, the page scheduler 215 requests the PDL analysis processing 2 of the PDL analysis program 209 to perform processing for the page Pcnt.

If it is determined that the page end notification is received from the DL generation processing 1 or the DL generation processing 2 (YES in step S1405), then in step S1430, the page scheduler 215 deletes the page information corresponding to the page notified by the page end notification from the page management table stored in the work memory 205.

In step S1431, the page scheduler 215 sends a DL storage destination related with the frame buffer 206 notified by the page end notification together with page information to the rasterization processing program 214 and requests the rasterization processing program 214 to perform the processing.

If it is determined that the job end notification is received from the PDL analysis processing 1 or the PDL analysis processing 2 (YES in step S1406), then in step S1440, the page scheduler 215 determines whether any page being currently processed remains in the page management table of the work memory 205.

If it is determined that the page being currently processed is present (YES in step S1440), then in step S1441, the page scheduler 215 waits for a page end notification sent from the DL generation processing 1 or the DL generation processing 2 of the DL generation program 210.

If it is determined that the page end notification is received (YES in step S1441), then in step S1442, the page scheduler 215 deletes the page information corresponding to the page notified by the page end notification from the page management table stored in the work memory 205.

Further, in step S1443, the page scheduler 215 sends a DL storage destination related with the frame buffer 206 notified by the page end notification together with page information to the rasterization processing program 214 and requests the rasterization processing program 214 to perform the processing.

If it is determined that there is not any page remaining in the page management table (NO instep S1440), then in step S1444, the page scheduler 215 sends a job end notification to the PDL analysis processing 1 and 2 of the PDL analysis program 209 and to the DL generation processing 1 and 2 of the DL generation program 210.

Figure 8:
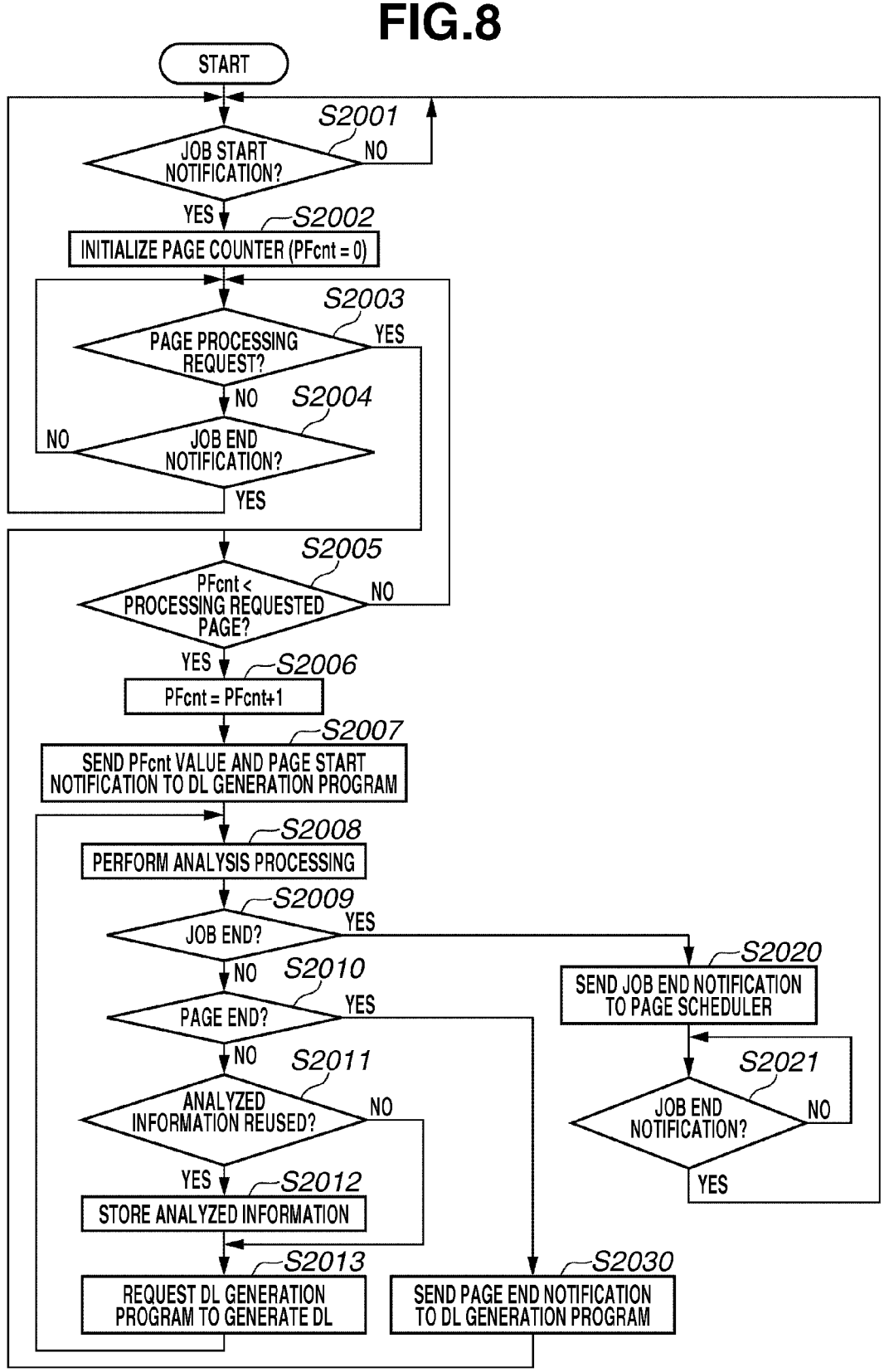
FIG. 8 is a flowchart illustrating an example of analysis processing for a page non-independent PDL according to the first exemplary embodiment of the present invention.

FIG. 8 is a flowchart illustrating an example of analysis processing for the page non-independent PDL according to the present exemplary embodiment. The PDL analysis processing program 209 executes the following processing. In step S2001, the PDL analysis processing program 209 waits for a job start notification sent from the page scheduler 215.

If the PDL analysis processing program 209 receives the job start notification (YES in step S2001), then in step S2002, the PDL analysis processing program 209 initializes the page counter (i.e., PFcnt=0). In step S2003, the PDL analysis processing program 209 waits for a page processing request sent from the page scheduler 215. Further, in step S2004, the PDL analysis processing program 209 waits for a job end notification sent from the page scheduler 215.

If the page processing request is received (YES in step S2003), then in step S2005, the PDL analysis processing program 209 compares the page counter PFcnt with the page notified by the processing request received in step S2003. For example, in a case where the PDL analysis processing 2 illustrated in FIG. 5 requests the m-th page, the PDL analysis processing program 209 compares the fourth page with the page counter PFcnt.

If it is determined that the processing requested page is larger than the page counter PFcnt (YES in step S2005), then in step S2006, the PDL analysis processing program 209 increments the page counter PFcnt (i.e., PFcnt=PFcnt+1). In step S2007, the PDL analysis processing program 209 sends the page counter PFcnt value and a page start notification to the DL generation processing of the DL generation program 210.

In the above-described case, the y-th page is the page whose intermediate data is generated by the DL generation processing 2 before the PDL analysis processing 2 analyzes the m-th page. Therefore, the page counter PFcnt represents the third page before it is incremented.

In step S2008, the PDL analysis processing program 209 reads stored data from the reception buffer 204 and performs analysis processing on the read data. The PDL analysis processing program 209 analyzes drawing commands of characters and graphics and other commands such as rasterization or usage of a resource.

In a case where the PDL analysis processing program 209 analyzes a command for rasterizing a resource that is shared by a plurality of pages in step S2008, it is unnecessary to perform rasterization of the resource if the same command is already executed. To confirm whether the same command is already executed, the PDL analysis processing program 209 is required to refer to the page management table of the page scheduler 215.

The PDL analysis processing program 209 identifies a page whose analysis processing is executed by the analysis processing program 209 being executed by another CPU. As the rasterization of the resource is already completed for the pages whose analysis processing is performed by the analysis processing program executed by another CPU, the corresponding resource rasterization processing can be omitted.

For example, the PDL analysis processing 2 illustrated in FIG. 5 does not perform resource rasterization processing for the n-th and preceding pages whose rasterization is already completed by the PDL analysis processing 1 and performs resource rasterization processing for the fourth page that is not yet rasterized by the PDL analysis processing 1.

In step S2009, the PDL analysis processing program 209 determines whether the analysis result is a job end. If it is determined that the analysis result is not the job end (NO in step S2009), then in step S2010, the PDL analysis processing program 209 determines whether the analysis result is a page end. If it is determined that the analysis result is not the page end (NO in step S2010), then in step S2011, the PDL analysis processing program 209 determines whether the analyzed information is necessary for the next and subsequent pages. If it is determined that the analyzed information is necessary (YES in step S2011), then in step S2012, the PDL analysis processing program 209 stores the analyzed information in the work memory 205.

Further, in a case where the analyzed information is a command that rasterizes the resource shared by a plurality of pages and the same resource is not stored in the work memory 205, processing for storing the rasterized resource in the work memory 205 is performed. For example, the PDL analysis processing 1 illustrated in FIG. 5 stores a resource corresponding to the first to third pages and the PDL analysis processing 2 stores a resource corresponding to the fourth page.

The PDL analysis processing program 209 that performs the analysis processing of step S2008 can use the resource stored in the work memory 205 if necessary. Therefore, the PDL analysis processing program 209 can omit rasterization processing for a resource whose rasterization is not required in the PDL analysis processing to be performed subsequently.

In step S2013, the PDL analysis processing program 209 requests the DL generation processing of the DL generation program 210 to generate a DL. If it is determined that the analysis result is the job end (YES instep S2009), then in step S2020, the PDL analysis processing program 209 sends a job end notification to the page scheduler 215.

In step S2021, the PDL analysis processing program 209 waits for a job end notification sent from the page scheduler 215. If it is determined that the job end notification is received from the page scheduler 215 (YES in step S2021), then in step S2001, the PDL analysis processing program 209 waits for a job start notification. If it is determined that the analysis result is the page end (YES in step S2010), then in step S2030, the PDL analysis processing program 209 sends a page end notification to the DL generation processing of the DL generation program 210 and the processing returns to step S2005.

Figure 9:
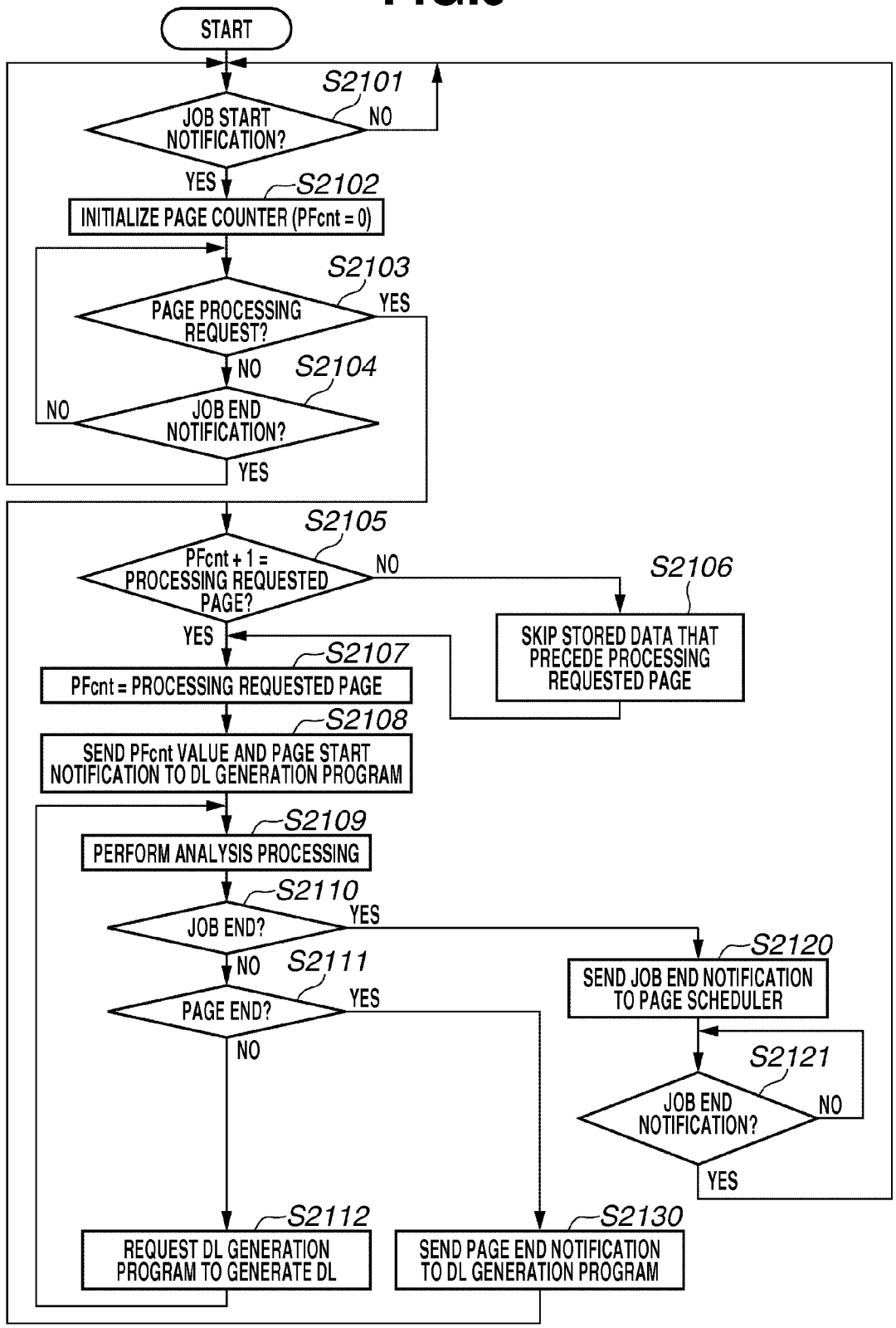
FIG. 9 is a flowchart illustrating an example of analysis processing for a page independent PDL according to the first exemplary embodiment of the present invention.

FIG. 9 is a flowchart illustrating an example of analysis processing for the page independent PDL according to the present exemplary embodiment. The PDL analysis processing program 209 executes the following processing.

In step S2101, the PDL analysis processing program 209 waits for a job start notification sent from the page scheduler 215. If the PDL analysis processing program 209 receives the job start notification (YES in step S2101), then in step S2102, the PDL analysis processing program 209 initializes the page counter (i.e., PFcnt=0). Instep S2103, the PDL analysis processing program 209 waits for a page processing request sent from the page scheduler 215. Further, in step S2104, the PDL analysis processing program 209 waits for a job end notification sent from the page scheduler 215.

If the page processing request is received (YES in step S2103), then in step S2105, the PDL analysis processing program 209 compares the page counter PFcnt with the page notified by the processing request received in step S2104. If it is determined that the processing requested page is different from PFcnt+1 (NO in step S2105), then in step S2106, the PDL analysis processing program 209 skips the data stored in the reception buffer 204 that precedes the head of the processing requested page.

In step S2107, the PDL analysis processing program 209 inputs the processing requested page to the page counter PFcnt. In step S2108, the PDL analysis processing program 209 sends the page counter PFcnt value and a page start notification to the DL generation processing of the DL generation program 210. In step S2109, the PDL analysis processing program 209 reads the data stored in the reception buffer 204 and performs analysis processing on the read data.

In step S2110, the PDL analysis processing program 209 determines whether the analysis result is a job end. If it is determined that the analysis result is not the job end (NO in step S2110), then in step S2111, the PDL analysis processing program 209 determines whether the analysis result is a page end. If it is determined that the analysis result is not the page end (NO in step S2111), then in step S2112, the PDL analysis processing program 209 requests the DL generation processing of the DL generation program 210 to generate a DL.

If it is determined that the analysis result is the job end (YES in step S2110), then in step S2120, the PDL analysis processing program 209 sends a job end notification to the page scheduler 215. Then, in step S2121, the PDL analysis processing program 209 waits for a job end notification sent from the page scheduler 215. If it is determined that the job end notification is received from the page scheduler 215 (YES in step S2121), then in step S2101, the PDL analysis processing program 209 waits for a job start notification.

If it is determined that the analysis result is the page end (YES in step S2111), then in step S2130, the PDL analysis processing program 209 sends a page end notification to the DL generation processing of the DL generation program 210. Then, the processing returns to step S2103 (i.e., the page processing notification step) and step S2104 (i.e., the job end notification waiting step).

Figure 10:
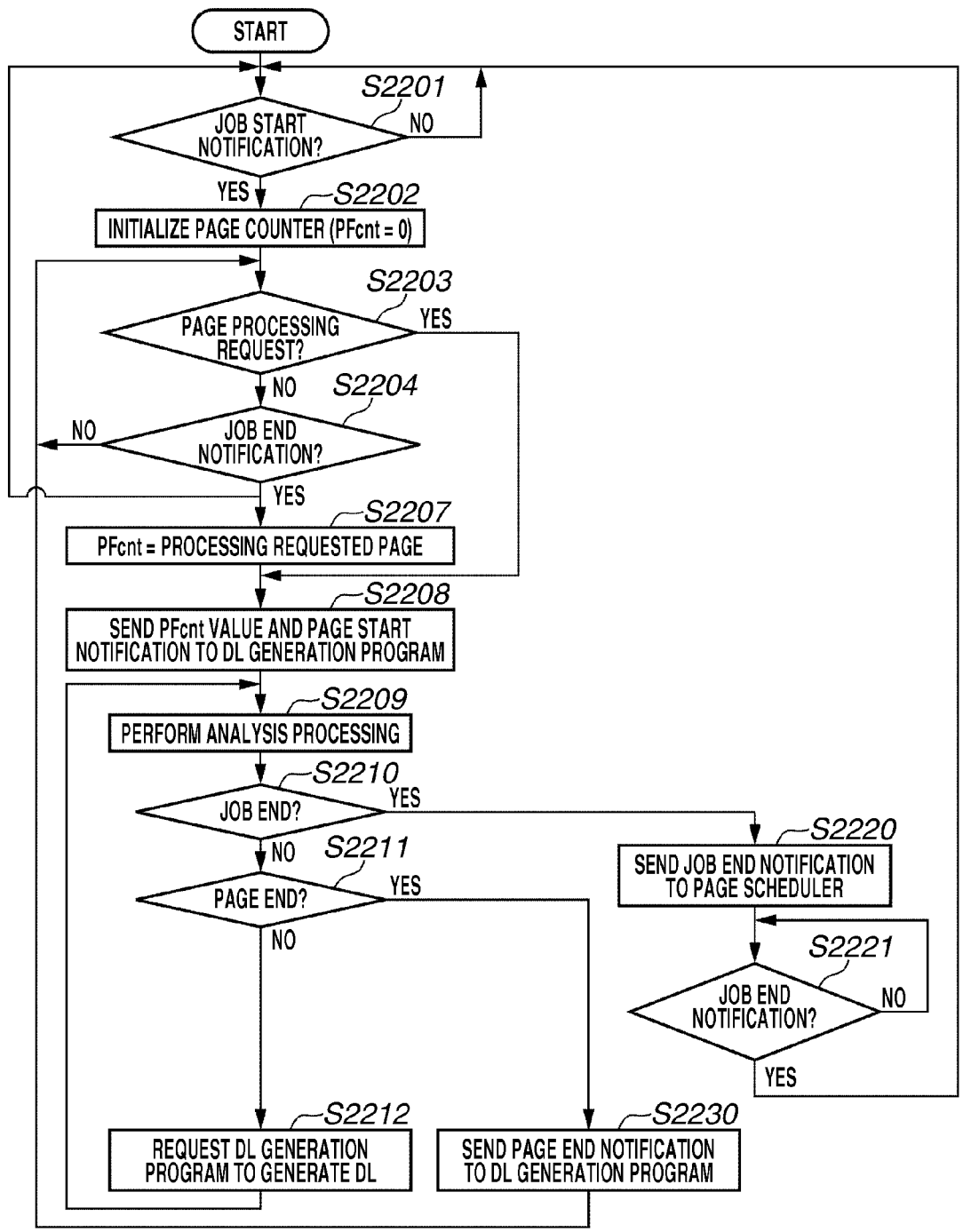
FIG. 10 is a flowchart illustrating an example of analysis processing for a page directly accessible PDL according to the first exemplary embodiment of the present invention.

FIG. 10 is a flowchart illustrating an example of analysis processing for the directly accessible PDL that can be performed by the PDL analysis processing program 209 according to the present exemplary embodiment. The PDL analysis processing program 209 executes the following processing.

In step S2201, the PDL analysis processing program 209 waits for a job start notification sent from the page scheduler 215. If the PDL analysis processing program 209 receives the job start notification (YES in step S2201), then in step S2202, the PDL analysis processing program 209 initializes the page counter (i.e., PFcnt=0). Instep S2203, the PDL analysis processing program 209 waits for a page processing request sent from the page scheduler 215. Further, in step S2204, the PDL analysis processing program 209 waits for a job end notification sent from the page scheduler 215.

If the page processing request is received (YES in step S2204), then in step S2207, the PDL analysis processing program 209 inputs a requested page number to the page counter PFcnt. Then, in step S2208, the PDL analysis processing program 209 sends the page counter PFcnt value and a page start notification to the DL generation processing of the DL generation program 210. In step S2209, the PDL analysis processing program 209 reads the page PFcnt from the data stored in the reception buffer 204 and performs analysis processing on the read page PFcnt.

In step S2210, the PDL analysis processing program 209 determines whether the analysis result is a job end. If it is determined that the analysis result is not the job end (NO in step S2210), then in step S2211, the PDL analysis processing program 209 determines whether the analysis result is a page end. If it is determined that the analysis result is not the page end (NO in step S2211), then in step S2212, the PDL analysis processing program 209 requests the DL generation processing of the DL generation program 210 to generate a DL.

If it is determined that the analysis result is the job end (YES in step S2210), then in step S2220, the PDL analysis processing program 209 sends a job end notification to the page scheduler 215. Then, in step S2221, the PDL analysis processing program 209 waits for a job end notification sent from the page scheduler 215. If the job end notification is received from the page scheduler 215 (YES in step S2221), then in step S2201, the PDL analysis processing program 209 waits for a job start notification.

If it is determined that the analysis result is the page end (YES in step S2211), then in step S2230, the PDL analysis processing program 209 sends a page end notification to the DL generation processing of the DL generation program 210.

Then, the processing returns to step S2203 (i.e., the page processing notification step) and to step S2204 (i.e., the job end notification waiting step).

Figure 11:
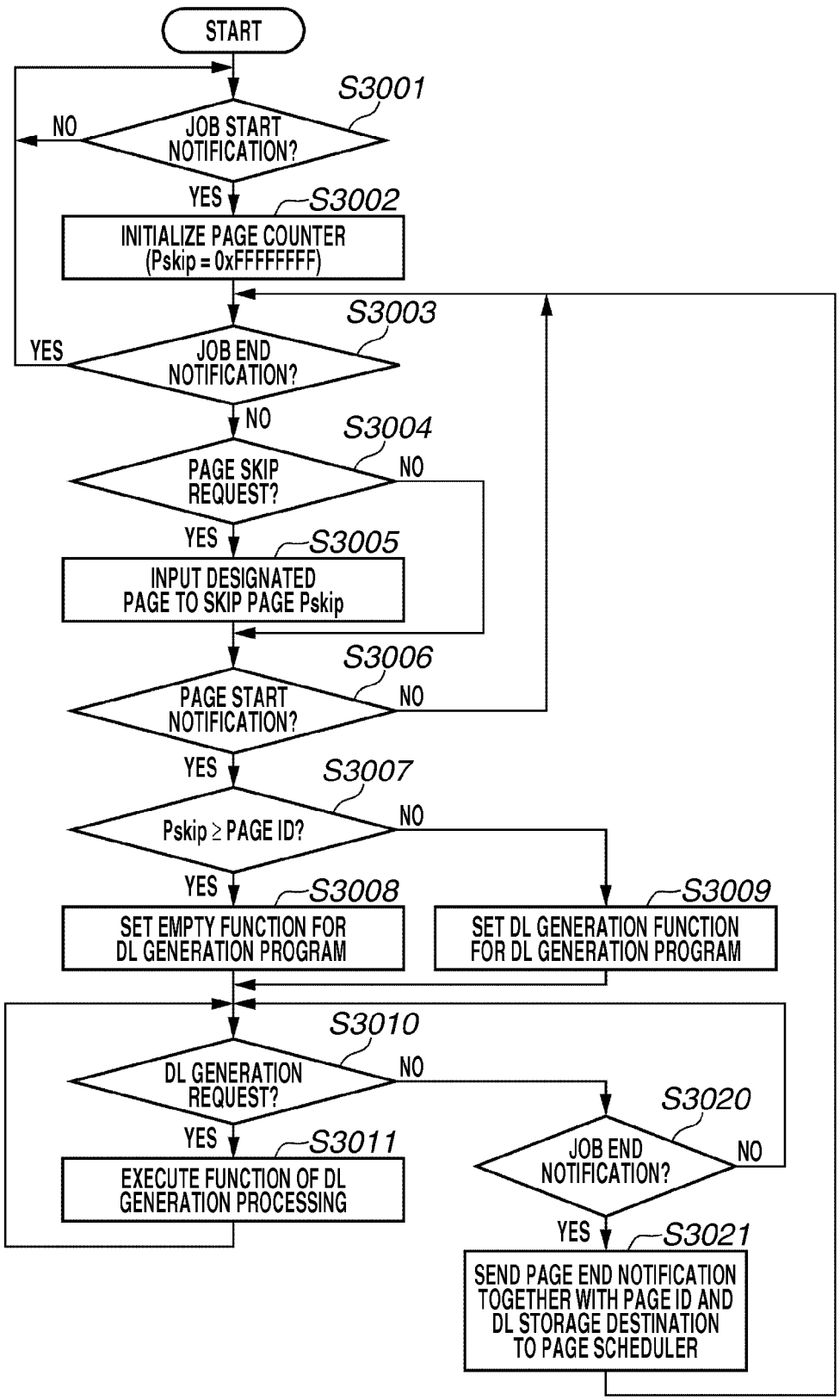
FIG. 11 is a flowchart illustrating an example of DL generation processing according to the first exemplary embodiment of the present invention.

FIG. 11 is a flowchart illustrating an example of DL generation processing that can be performed by the DL generation program 210 according to the present exemplary embodiment. The DL generation program 210 executes the following processing. In step S3001, the DL generation program 210 waits for a job start notification sent from the page scheduler 215. If the DL generation program 210 receives the job start notification (YES in step S3001), then in step S3002, the DL generation program 210 initializes a skip page Pskip to 0xFFFFFFFF.

In step S3003, the DL generation program 210 determines whether a job end notification is received from the page scheduler 215. If the job end notification is not received (NO in step S3003), then in step S3004, the DL generation program 210 determines whether a page skip request is received from the page scheduler 215. If the page skip request is received (YES in step S3004), then in step S3005, the DL generation program 210 inputs a page designated by the page skip request to the skip page Pskip.

For example, in a case where the DL generation processing 2 illustrated in FIG. 5 generates the fourth page, the page scheduler 215 requests skipping the first to third pages. Thus, the DL generation program 210 inputs the fourth page (i.e., the page following the third page) to the skip page Pskip.

In step S3006, the DL generation program 210 determines whether a page start notification is received from the analysis processing of the PDL analysis program 209. If the page start notification is received (YES in step S3006), then in step S3007, the DL generation program 210 compares the skip page Pskip with a page ID included in the page start notification. If it is determined that the skip page Pskip is greater than the page designated by the page start notification (YES in step S3007), then in step S3008, the DL generation program 210 sets an empty function that does not perform any processing for the DL generation processing.

Through the above-described processing, in the above-described example case, the DL generation processing 2 does not generate any intermediate data of the first to third pages. In a case where the skip page Pskip is smaller than the page designated by the page start notification (NO in step S3007), then in step S3009, the DL generation program 210 sets a mathematical function that causes the DL generation processing to execute processing and stores the DL in the frame buffer 206. In a case where the page requested for the DL generation processing 2 illustrated in FIG. 5 is the fourth page, the page ID is equal to 4. In this case, the DL generation program 210 executes the processing of step S2009.

If it is determined that a DL generation request is received from the analysis processing of the PDL analysis program 209 (YES in step S3010), then in step S3011, the DL generation program 210 executes a mathematical function for the DL generation processing. If the DL generation request is not received (NO in step S3010), then in step S3020, the DL generation program 210 determines whether a page end notification is received. If the page end notification is received (YES in step S3020), then in step S3021, the DL generation program 210 sends a page end notification together with the page ID and a DL storage destination related with the frame buffer 206 to the page scheduler 215.

Figure 12:
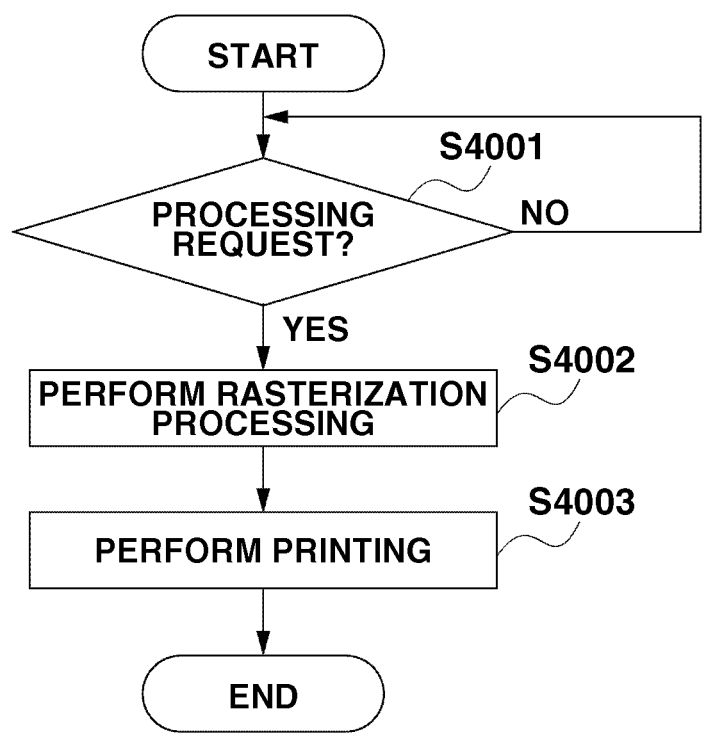
FIG. 12 is a flowchart illustrating an example of rasterization processing according to the first exemplary embodiment of the present invention.

FIG. 12 is a flowchart illustrating an example of the rasterization processing that can be performed by the rasterization processing program 214 according to the present exemplary embodiment. In step S4001, the rasterization processing program 214 determines whether a processing request is received from the page scheduler 215. If the processing request is received (YES in step S4001), then in step 4002, the rasterization processing program 214 reads a processing requested DL from the frame buffer 206 and rasterizes the read DL into bitmap data, and then stores the bitmap data in the raster memory 207. In step 4003, the rasterization processing program 214 outputs the bitmap data stored in the raster memory 207 to the printer engine 213 via the engine I/F 212. The printer engine 213 performs printing.

Figure 15B:
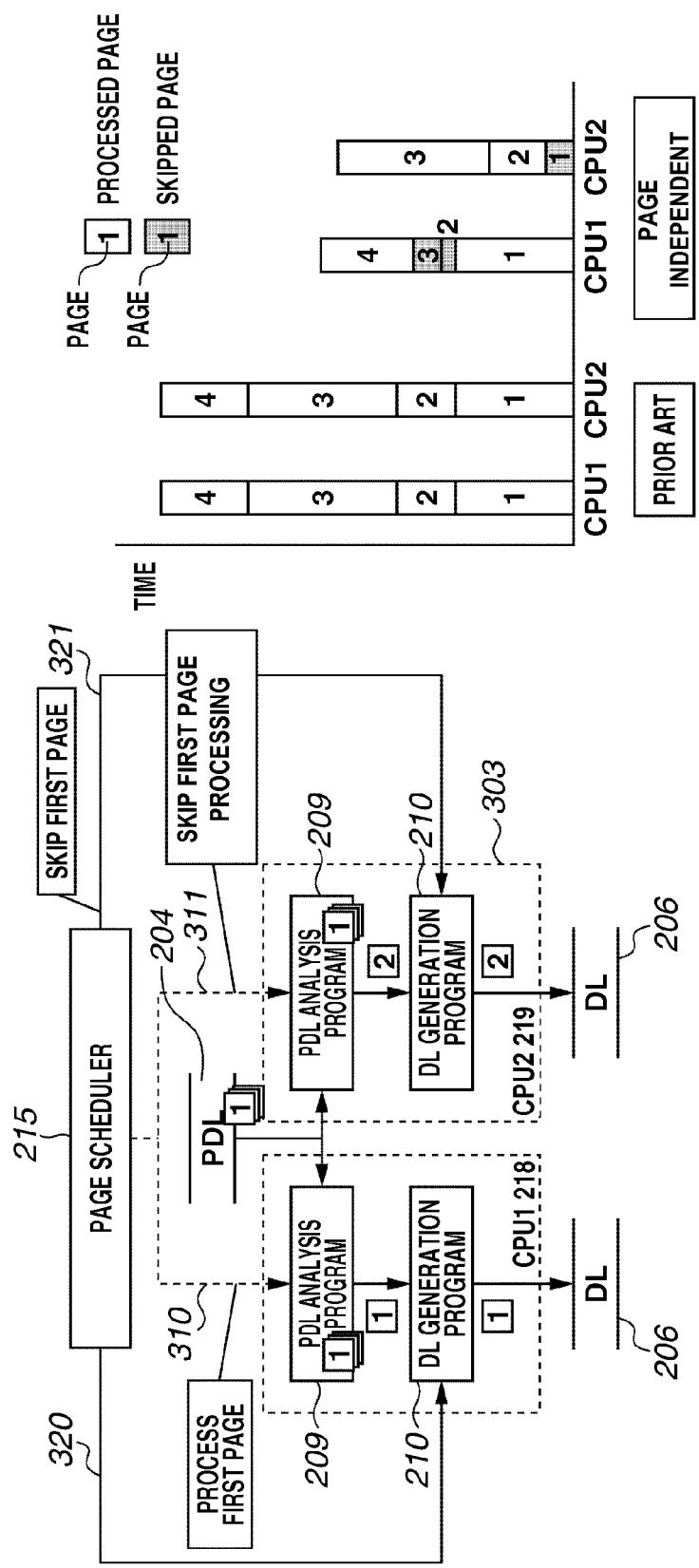
Figure 15C:
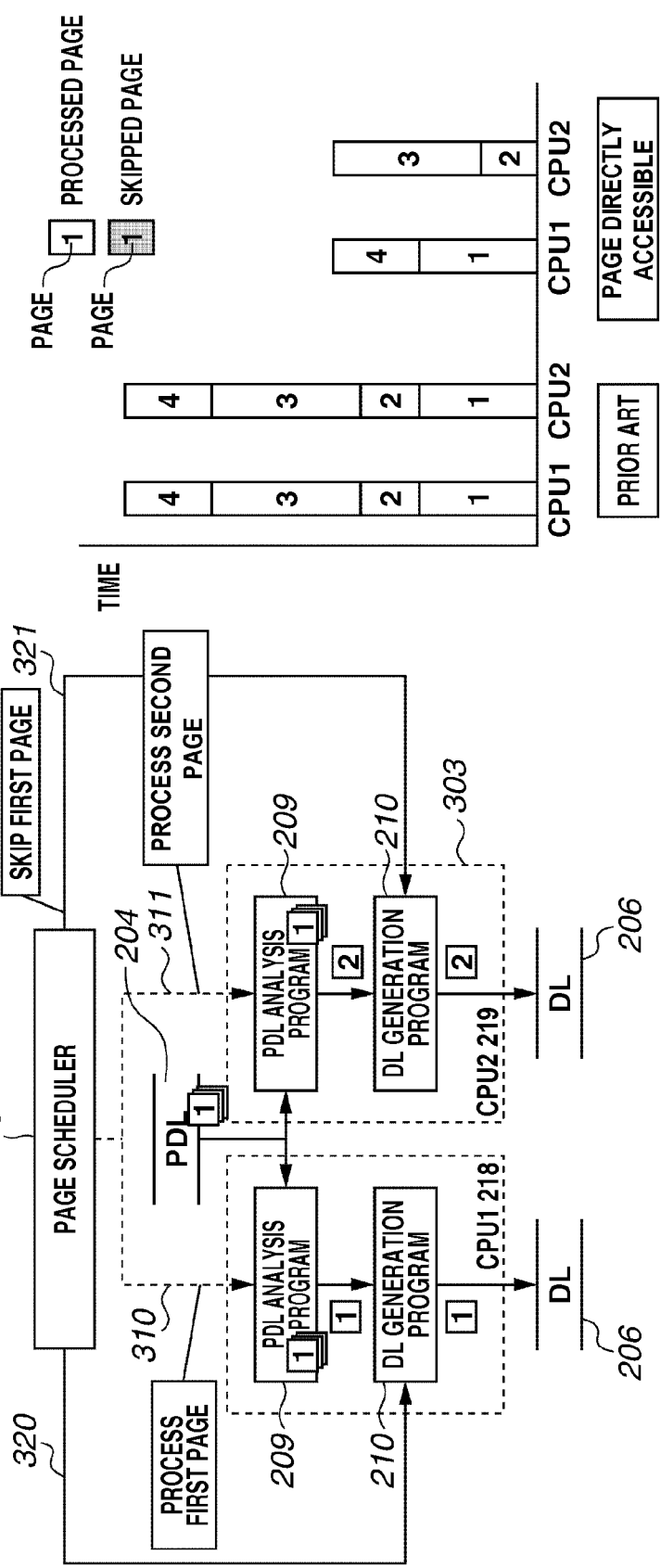

FIGS. 15A, 15B, and 15C illustrate examples of a relationship between a module control and required processing time in the scheduling processing according to the present exemplary embodiment.

FIG. 15A illustrates a relationship between an example module control and required processing time in a case where the PDL to be processed is a page non-independent PDL. In this case, the page scheduler 215 sends the control command 310 to the PDL analysis program 209 of the CPU1 218 to request processing of the first page. Further, the page scheduler 215 sends the control command 311 to the PDL analysis program 209 of the CPU2 219 to request processing of the first and second pages.

The reason why the above-described processing is performed is because the DL generation program cannot execute the DL generation processing for a requested page unless rasterization of a resource of pages that precede the requested page is completed. The page scheduler 215 sends the control command 321 to the DL generation program 210 of the CPU2 219 to request skipping of the first page. The time required for the above-described processing is shorter than a conventional processing time, although a significant time is required for the page skipping operation. In this manner, the present exemplary embodiment can speedily accomplish drawing processing for a PDL including two or more pages that share a resource.

FIG. 15B illustrates a relationship between an example module control and required processing time in a case where the PDL to be processed is a page independent PDL. In this case, the page scheduler 215 sends the control command 310 to the PDL analysis program 209 of the CPU1 218 to request processing of the first page. Further, the page scheduler 215 sends the control command 311 to the PDL analysis program 209 of the CPU2 219 to request skipping of the first page and processing of the second page. The processing time required in this case is shorter than the processing time for the page non-independent PDL because the time required for the page skipping operation can be further reduced.

FIG. 15C illustrates a relationship between an example module control and required processing time in a case where the PDL to be processed is a page directly accessible PDL. In this case, the page scheduler 215 sends the control command 310 to the PDL analysis program 209 of the CPU1 218 to request processing of the first page. Further, the page scheduler 215 sends the control command 311 to the PDL analysis program 209 of the CPU2 219 to request processing of the second page. The processing time required in this case is shorter than the processing time for the page independent PDL because the page skipping operation is not required.

In the above-described exemplary embodiment, the number of CPUs used to perform operations is only two (i.e., the CPU1 218 serving as the first processor and the CPU2 219 serving as the second processor). However, it is useful to use a third processor that can perform the above-described PDL analysis processing and the DL generation processing. It is useful to use one core processor to execute one PDL analysis processing program and one DL generation processing program. It is useful to use a multicore processor that can serve as the CPU. Further, it is useful to use a micro processing unit (MPU) that can perform functions comparable to those of the CPU that performs the PDL analysis processing and the DL generation processing.

Further, in the above-described exemplary embodiment, switching between the PDL analysis processing and the DL generation processing is performed according to the type of each PDL. However, it is useful to enable a user to designate specific PDL analysis processing and specific DL generation processing. In this case, the user can designate preferred processing via an operation panel of the image forming apparatus 102 or a PC connected to the network 104.

Further, in the above-described exemplary embodiment, the image forming apparatus 102 performs the PDL analysis processing and the DL generation processing according to the type of each PDL (e.g., non-independent PDL, independent PDL, and directly accessible PDL). However, the image forming apparatus 102 can perform the PDL analysis processing and the DL generation processing on only one or two of the non-independent PDL, the independent PDL, and the directly accessible PDL. For example, the image forming apparatus 102 can perform the PDL analysis processing and the DL generation processing according to each of the non-independent PDL and the independent PDL.

Further, in a case where the PDL to be processed is the non-independent PDL, the CPU1 218 and the CPU2 219 share a resource that is shared for a plurality of pages to speedily accomplish the analysis processing. However, although the above-described effects may be reduced, it is also useful for each CPU to independently hold a resource that is shared for a plurality of pages.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-192236 filed Aug. 21, 2009, which is hereby incorporated by reference herein in its entirety.

What is claimed is:

1. An information processing apparatus comprising:
a schedule unit configured to allocate a certain page in received print data to execution units;
a first execution unit configured to generate intermediate data from the page allocated to the first execution unit;
a second execution unit configured to generate intermediate data from the page allocated to the second execution unit in parallel with the first execution unit to generate the intermediate data; and
a determination unit configured to determine whether or not the received print data is in an independent format,
wherein the schedule unit allocates an m-th page to the first execution unit and an n-th page to the second execution unit, the n indicating a larger integer than the m,
wherein the first execution unit rasterizes a resource of the print data of the m-th page and pages preceding the m-th page and generates intermediate data of the m-th page using the rasterized resource and the second execution unit rasterizes a resource of the print data of the n-th page and pages preceding the n-th page and generates intermediate data of the n-th page using the rasterized resource, in a case where the determination unit determines that the received print data is not in an independent format,
wherein the first execution unit rasterizes a resource of the print data of the m-th page without rasterizing a resource of the print data of pages preceding the m-th page and generates intermediate data of the m-th page using the rasterized resource and the second execution unit rasterizes a resource of the print data of the n-th page without rasterizing a resource of the print data of pages preceding the n-th page and generates intermediate data of the n-th page using the rasterized resource, in a case where the determination unit determines that the received print data is in an independent format,
wherein the determination unit further determines whether the received print data is in a directly accessible format in the case where the determination unit determines the received print data is in an independent format,
wherein the first execution unit skips the pages preceding the m-th page and rasterizes a resource of the print data of the m-th page without rasterizing a resource of the print data of pages preceding the m-th page and generates intermediate data of the m-th page using the rasterized resource and the second execution unit skips the pages preceding the n-th page and rasterizes a resource of the print data of the n-th page without rasterizing a resource of the print data of pages preceding the n-th page and generates intermediate data of the n-th page using the rasterized resource, in a case where the determination unit determines that the received data is not in a directly accessible format, and
wherein the first execution unit directly reads the m-th page without analyzing the print data of the pages preceding the m-th page, rasterizes a resource of the print data of the m-th page without rasterizing a resource of the print data of the pages preceding the m-th page and generates intermediate data using the rasterized resource and the second execution unit directly reads the n-th page without analyzing the print data of the pages preceding the n-th page, rasterizes a resource of the print data of the n-th page without rasterizing a resource of the print data of the pages preceding the n-th page and generates intermediate data using the rasterized resource, in a case where the determination unit determines that the received data is in a directly accessible format.

2. A method comprising:
a scheduling step of allocating a certain page in received print data to execution units;
a first execution step of generating intermediate data from the page allocated to a first execution unit;
a second execution step of generating intermediate data from the page allocated to a second execution unit in parallel with the first execution step to generate the intermediate data; and
a determination step of determining whether or not the received print data is in an independent format, wherein the scheduling step comprises allocating an m-th page to the first execution unit and an n-th page to the second execution unit, the n indicating a larger integer than the m, wherein the first execution step comprises rasterizing a resource of the print data of the m-th page and pages preceding the m-th page and generating intermediate data of the m-th page using the rasterized resource and the second execution step comprises rasterizing a resource of the print data of the n-th page and pages preceding the n-th page and generating intermediate data of the n-th page using the rasterized resource, in a case where it is determined that the received print data is not in an independent format, wherein the first execution step comprises rasterizing a resource of the print data of the m-th page without rasterizing a resource of the print data of pages preceding the m-th page and generating intermediate data of the m-th page using the rasterized resource and the second execution step comprises rasterizing a resource of the print data of the n-th page without rasterizing a resource of the print data of pages preceding the n-th page and generating intermediate data of the n-th page using the rasterized resource, in a case where it is determined that the received print data is in an independent format, wherein the determination step further comprises determining whether the received print data is in a directly accessible format in the case where it is determined that the received print data is in an independent format, wherein the first execution step comprises skipping the pages preceding the m-th page and rasterizing a resource of the print data of the m-th page without rasterizing a resource of the print data of pages preceding the m-th page and generating intermediate data of the m-th page using the rasterized resource and the second execution step comprises skipping the pages preceding the n-th page and rasterizing a resource of the print data of the n-th page without rasterizing a resource of the print data of pages preceding the n-th page and generating intermediate data of the n-th page using the rasterized resource, in a case where it is determined that the received data is not in a directly accessible format, and wherein the first execution step comprises directly reading the m-th page without analyzing the print data of the pages preceding the m-th page, rasterizing a resource of the print data of the m-th page without rasterizing a resource of the print data of the pages preceding the m-th page and generating intermediate data using the rasterized resource and the second execution step comprises directly reading the n-th page without analyzing the print data of the pages preceding the n-th page, rasterizing a resource of the print data of the n-th page without rasterizing a resource of the print data of the pages preceding the n-th page and generating intermediate data using the rasterized resource, in a case where it is determined that the received data is in a directly accessible format.

3. A non-transitory computer-readable storage medium storing a software program that causes a computer to perform a method, the method comprising:

a scheduling step of allocating a certain page in received print data to execution units;

a first execution step of generating intermediate data from the page allocated to a first execution unit;

a second execution step of generating intermediate data from the page allocated to a second execution unit in parallel with the first execution step to generate the intermediate data; and a determination step of determining whether or not the received print data is in an independent format, wherein the scheduling step comprises allocating an m-th page to the first execution unit and an n-th page to the second execution unit, the n indicating a larger integer than the m, wherein the first execution step comprises rasterizing a resource of the print data of the m-th page and pages preceding the m-th page and generating intermediate data of the m-th page using the rasterized resource and the second execution step comprises rasterizing a resource of the print data of the n-th page and pages preceding the n-th page and generating intermediate data of the n-th page using the rasterized resource, in a case where it is determined that the received print data is not in an independent format, wherein the first execution step comprises rasterizing a resource of the print data of the m-th page without rasterizing a resource of the print data of pages preceding the m-th page and generating intermediate data of the m-th page using the rasterized resource and the second execution step comprises rasterizing a resource of the print data of the n-th page without rasterizing a resource of the print data of pages preceding the n-th page and generating intermediate data of the n-th page using the rasterized resource, in a case where it is determined that the received print data is in an independent format, wherein the determination step further comprises determining whether the received print data is in a directly accessible format in the case where it is determined that the received print data is in an independent format, wherein the first execution step comprises skipping the pages preceding the m-th page and rasterizing a resource of the print data of the m-th page without rasterizing a resource of the print data of pages preceding the m-th page and generating intermediate data of the m-th page using the rasterized resource and the second execution step comprises skipping the pages preceding the n-th page and rasterizing a resource of the print data of the n-th page without rasterizing a resource of the print data of pages preceding the n-th page and generating intermediate data of the n-th page using the rasterized resource, in a case where it is determined that the received data is not in a directly accessible format, and wherein the first execution step comprises directly reading the m-th page without analyzing the print data of the pages preceding the m-th page, rasterizing a resource of the print data of the m-th page without rasterizing a resource of the print data of the pages preceding the m-th page and generating intermediate data using the rasterized resource and the second execution step comprises directly reading the n-th page without analyzing the print data of the pages preceding the n-th page, rasterizing a resource of the print data of the n-th page without rasterizing a resource of the print data of the pages preceding the n-th page and generating intermediate data using the rasterized resource, in a case where it is determined that the received data is in a directly accessible format.

* * * * *